United States Patent
Suzuki et al.

(10) Patent No.: US 7,946,475 B2
(45) Date of Patent: May 24, 2011

(54) FINANCIAL SERVER, IC CARD TERMINAL, AND FINANCIAL INFORMATION PROCESSING METHOD

(75) Inventors: Mikihisa Suzuki, Tokyo (JP); Tsutomu Okude, Tokyo (JP)

(73) Assignee: Sony Corporation, Tokyo (JP)

( * ) Notice: Subject to any disclaimer, the term of this patent is extended or adjusted under 35 U.S.C. 154(b) by 907 days.

(21) Appl. No.: 11/726,981

(22) Filed: Mar. 23, 2007

(65) Prior Publication Data

US 2008/0230601 A1    Sep. 25, 2008

(51) Int. Cl.
*G07F 19/00* (2006.01)
(52) U.S. Cl. .......................... 235/379; 235/380
(58) Field of Classification Search ................. 235/379, 235/380, 492
See application file for complete search history.

(56) References Cited

U.S. PATENT DOCUMENTS

| | | | | |
|---|---|---|---|---|
| 7,195,174 | B2 * | 3/2007 | Kogawa | 235/492 |
| 7,440,922 | B1 * | 10/2008 | Kempkes et al. | 705/39 |
| 2004/0078332 | A1 * | 4/2004 | Ferguson et al. | 705/41 |
| 2004/0155101 | A1 * | 8/2004 | Royer et al. | 235/379 |
| 2004/0172362 | A1 * | 9/2004 | Hausmann et al. | 705/41 |

FOREIGN PATENT DOCUMENTS

| | | |
|---|---|---|
| JP | 2002-123771 | 4/2002 |
| JP | 2002-279531 | 9/2002 |
| JP | 2003-061943 | 3/2003 |
| JP | 2003-141428 | 5/2003 |
| JP | 2004-030235 | 1/2004 |
| JP | 2004-272561 | 9/2004 |
| JP | 2006-133857 | 5/2006 |

* cited by examiner

*Primary Examiner* — Ahshik Kim
(74) *Attorney, Agent, or Firm* — K&L Gates LLP

(57) ABSTRACT

A credit card 8 is an IC card, and a PIN is authenticated between a card terminal 3 and the credit card 8. The card terminal 3 transmits to a credit company server 4 an authentication result, amount information indicating an amount to charge up, and a credit card number of the credit card 8. After billing, the credit company server 4 transmits the amount information and the credit card number to an electronic money server 5. The electronic money server 5 identifies an electronic money card 9 based on the credit card number. The electronic money server 5 generates amount change information for adding the amount with which to charge up to "VALUE", and transmits it to the card terminal 3. Based on the amount change information, the electronic money card 9 updates the amount of "VALUE" stored therein to an amount specified by the amount change information.

6 Claims, 14 Drawing Sheets

Fig. 2
(A)
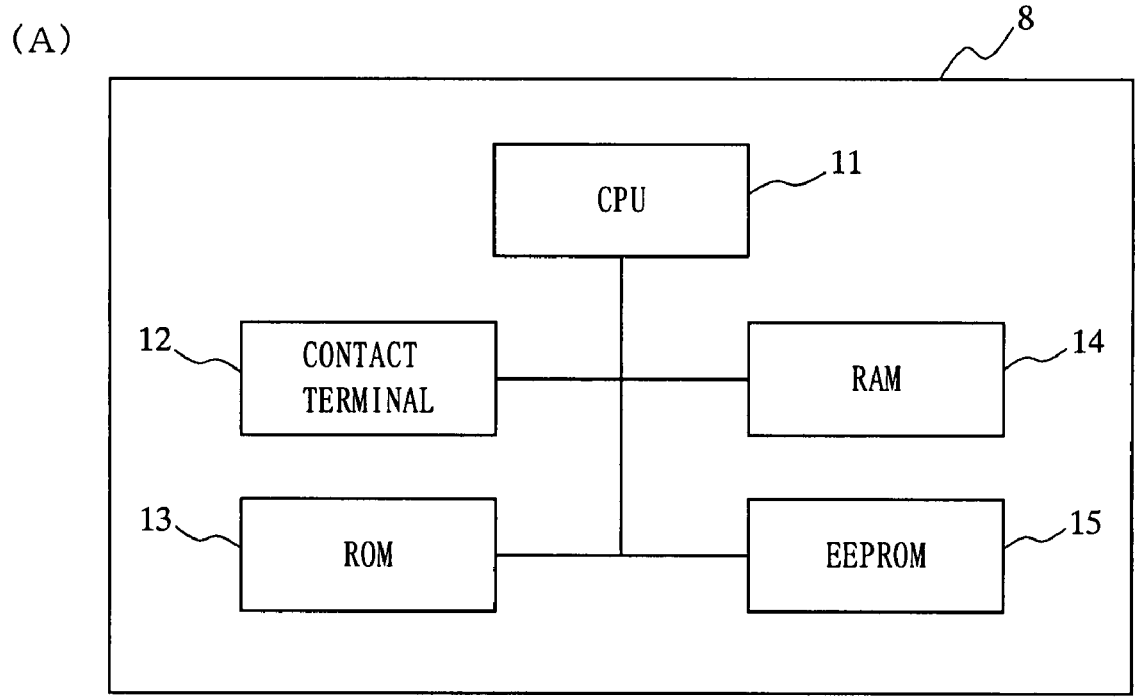
(B)
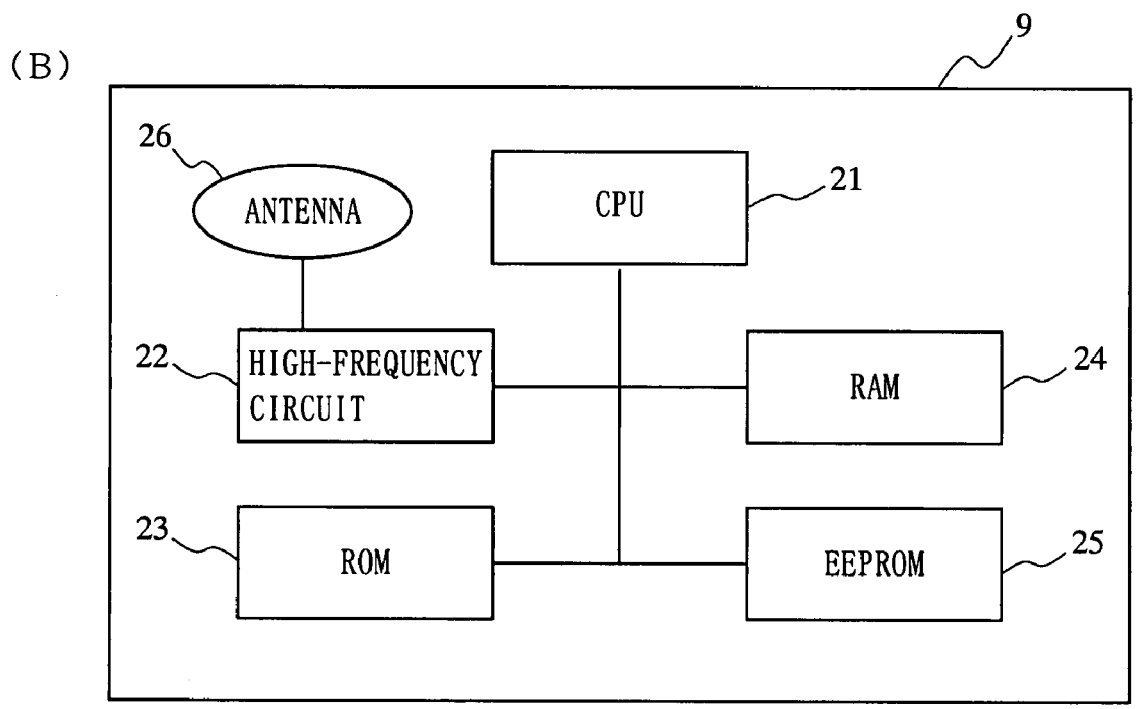

| CREDIT CARD NUMBERS | PINS | NAMES | BILLING ACCOUNTS | ... |
|---|---|---|---|---|
| 987654321 | 9999 | YAMADA TARO | ○×BANK | ... |
| ... | ... | ... | ... | ... |

(B)

| CREDIT CARD NUMBERS | BILLED AMOUNTS | CARD TERMINAL IDS | DATES AND TIMES | ... |
|---|---|---|---|---|
| 987654321 | $ 2,000 | ... | ... | ... |
| ... | ... | ... | ... | ... |

| ELECTRONIC MONEY CARD NUMBER | USER NAMES | PASSWORDS | ... |
|---|---|---|---|
| 12345678 | YAMADA TARO | abcdefg | ... |
| ... | ... | ... | ... |

(B)

| ELECTRONIC MONEY CARD NUMBER | AMOUNTS | EXPIRATION DATES | CHARGING-UP | ... |
|---|---|---|---|---|
| 12345678 | $ 2,000 | 2004/7/7 | COMPLETED | ... |
| ... | ... | ... | ... | ... |

Fig. 9
(A)
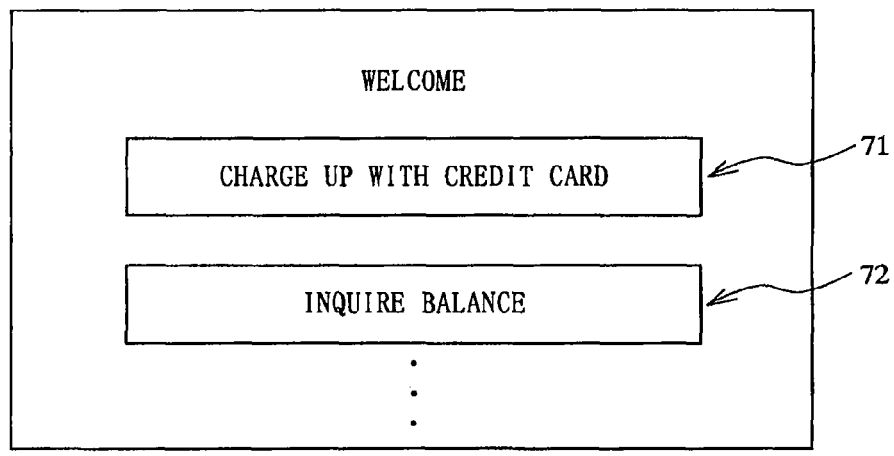
(B)
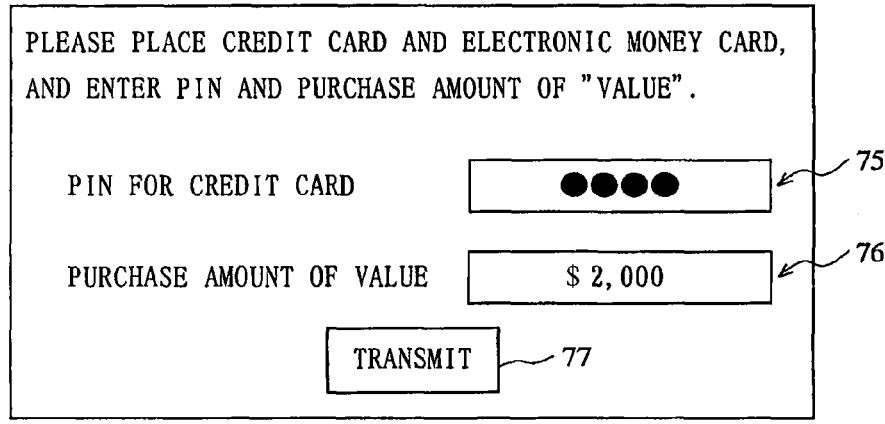

PLEASE PLACE ELECTRONIC MONEY CARD AND ENTER PASSWORD.

PASSWORD  ●●●● ← 80

TRANSMIT ~ 81

(B)

AMOUNT AVAILABLE FOR CHARGING-UP: $2,000

WOULD YOU LIKE TO CHARGE UP?

YES ~ 83    NO ~ 84

(C)

CHARGED UP WITH $2,000.

THE BALANCE AFTER CHARGING-UP IS $3,000.

Fig. 14
(A)
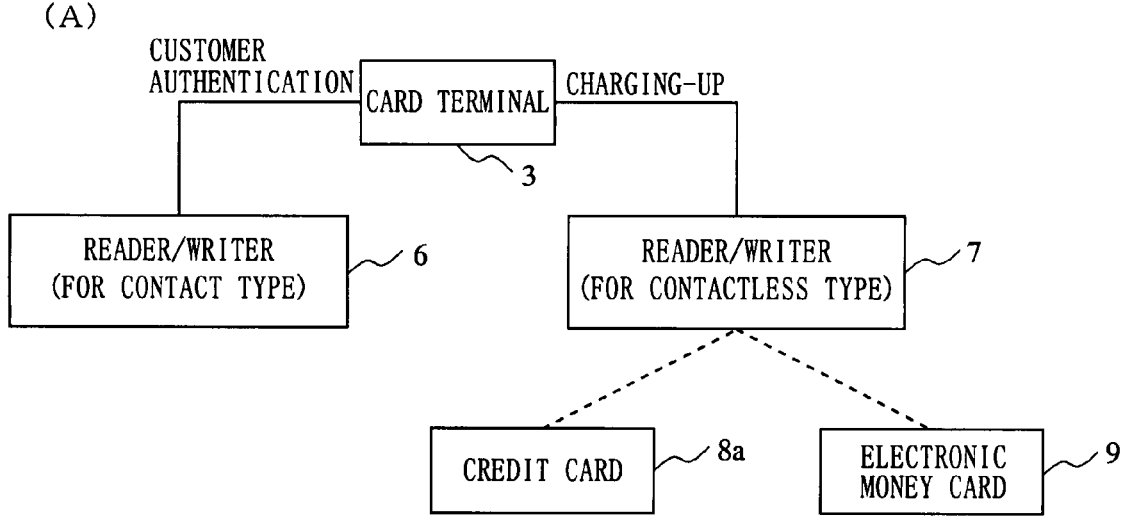
(B)
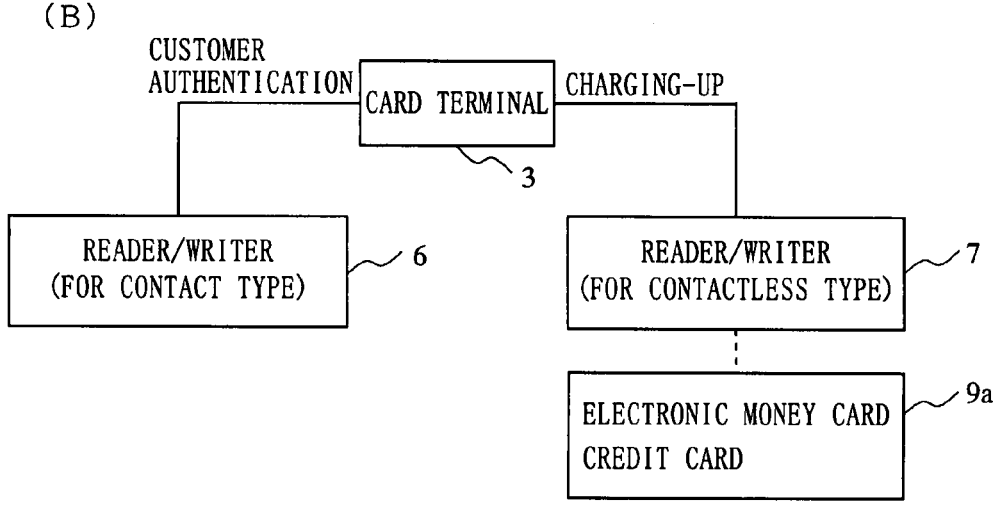
(C)
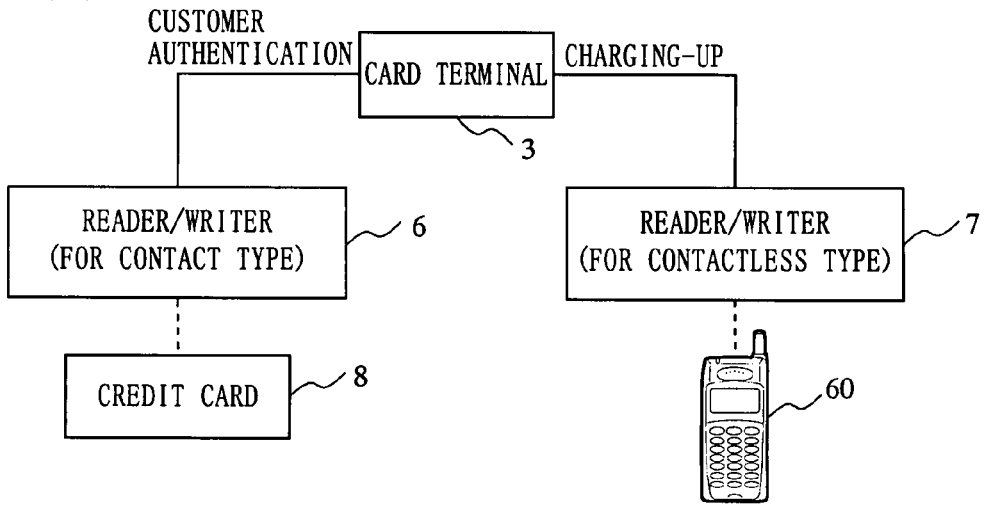

FINANCIAL SERVER, IC CARD TERMINAL, AND FINANCIAL INFORMATION PROCESSING METHOD

BACKGROUND OF THE INVENTION

1. Field of the Invention

The present invention relates to a financial server, an IC card terminal, and a financial information processing method, which are related to, for example, purchasing electronic money with a credit card.

2. Description of the Background Art

In recent years, settlement systems using electronic money have been introduced to retail shops and department stores, and come into wide use.

The electronic money has a monetary value, called "VALUE", which is equivalent to money and stored to, for example, an IC card provided as an electronic money card or a cell phone compatible with the electronic money, and the IC card or the cell phone is used as an electronic wallet.

The process of writing the "VALUE" to the IC card or the like is referred to as "charging up", which can be performed using a dedicated terminal device (hereinafter, an "electronic money terminal") installed at a store such as a retail shop, or it can be performed from an electronic money server via the Internet.

Settlement by "VALUE" is performed by subtracting a payment amount from the amount of "VALUE" stored in the IC card or the like, and as in the case of the charging-up, the settlement can be performed using the electronic money terminal or the electronic money server.

An invention that uses the electronic money in a manner as described above is disclosed by the present applicant in unpublished Patent Application No. 2003-61943.

In this invention, a cell phone provided with a function of connecting to the Internet and a function of handling the electronic money accesses the electronic money server, and charges itself up with the electronic money while communicating with the electronic money server.

This invention allows the user to perform the charging-up, for example, without being restricted to any physical locations and business hours.

Incidentally, recent years have seen growing use of IC cards as credit cards. Conventional credit cards with a magnetic stripe are being replaced with ones that include an IC chip, which can provide a highly secured credit card system that makes it difficult to forge credit cards.

In addition, it is also possible that bank cash cards with a magnetic stripe are switched to IC cards.

Charging up the electronic money card by using a credit card has been carried out for some time, but for security reasons, it is necessary to install dedicated lines between card terminals and a credit company server to authenticate credit cards, and such installation is costly.

SUMMARY OF THE INVENTION

Therefore, an object of the present invention is to provide an inexpensive system capable of charging up electronic money cards by using a credit card.

To attain the above object, a first aspect of the present invention is directed to a financial server comprising: a card information reception means for receiving card specification information and amount information from an IC card terminal having authenticated an owner of a financial IC card based on authentication information stored in the financial IC card, wherein the card specification information specifies the financial IC card; a card information providing means for providing an amount change information transmission section with the amount information and owner identification information for the owner specified by the card specification information, wherein the amount change information transmission means transmits amount change information for increasing an amount of a monetary value to a monetary terminal, which increases/decreases an amount of the monetary value stored therein based on the amount change information; and a billing means for billing the owner for a fee based on the provided amount information.

In a second aspect of the invention, based on the first aspect, the card information reception means receives the owner identification information for the owner, along with the card specification information, and the card information providing means provides the received owner identification information to the amount change information transmission means.

A third aspect of the invention is directed to an IC card terminal comprising: an authentication means for authenticating an owner of a financial IC card based on authentication information stored in the financial IC card; a card specification information acquisition means for acquiring card specification information for specifying the financial IC card from the financial IC card; an amount information acquisition means for acquiring amount information for the authenticated owner; a card information transmission means for transmitting the acquired card specification information and the acquired amount information to a financial server of the first aspect; an amount change information reception means for receiving amount change information, which is transmitted from an amount change information transmission means in response to the transmitted card specification information and amount information; and an input means for inputting the received amount change information to a monetary terminal, which increases/decreases an amount of a monetary value stored therein based on the amount change information.

A fourth aspect of the invention is directed to a financial information processing method for use in a computer provided with a card information reception means, a card information providing means and a billing means, the method comprising: a card information reception step performed by the card information reception means for receiving card specification information and amount information from an IC card terminal having authenticated an owner of a financial IC card based on authentication information stored in the financial IC card, wherein the card specification information specifies the financial IC card; a card information providing step performed by the card information providing means for providing an amount change information transmission means with the amount information and owner identification information for the owner specified by the card specification information, wherein the amount change information transmission means transmits amount change information for increasing an amount of a monetary value to a monetary terminal, which increases/decreases an amount of the monetary value stored therein based on the amount change information; and a billing step performed by the billing means for billing the owner for a fee based on the provided amount information.

A fifth aspect of the invention is directed to a financial information processing method for use in a computer provided with an authentication means, a card specification information acquisition means, an amount information acquisition means, a card information transmission means, an amount change information reception means and an input means, the method comprising: an authentication step performed by the authentication means for authenticating an owner of a financial IC card based on authentication information stored in the financial IC card; a card specification information acquisition step performed by the card specification information acquisition means for acquiring card specification information for specifying the financial IC card from the financial IC card; an amount information acquisition step performed by the amount information acquisition means for acquiring amount information for the authenticated owner; a card information transmission step performed by the card information transmission means for transmitting the acquired card specification information and the acquired amount information to a financial server of the first aspect; an amount change information reception step performed by the amount change information reception means for receiving amount change information, which is transmitted from amount change information transmission means in response to the transmitted card specification information and amount information; and an input step performed by the input means for inputting the received amount change information to a monetary terminal, which increases/decreases an amount of a monetary value stored therein based on the amount change information.

The present invention makes it possible to provide an inexpensive system capable of charging up electronic money cards by using a credit card.

BRIEF DESCRIPTION OF THE DRAWINGS

FIG. 2A is a block diagram illustrating an exemplary hardware configuration of a credit card.

FIG. 2B is a block diagram illustrating an exemplary hardware configuration of an electronic money card.

FIG. 4A illustrates an exemplary logical configuration of a database stored in a credit company server.

FIG. 4B illustrates an exemplary logical configuration of another database stored in the credit company server.

FIG. 6A illustrates an exemplary logical configuration of a database stored in an electronic money server.

FIG. 6B illustrates an exemplary logical configuration of another database stored in the electronic money server.

FIG. 9A is a diagram illustrating an exemplary screen displayed on the card terminal when purchasing "VALUE" with a credit card.

FIG. 9B is a diagram illustrating another exemplary screen displayed on the card terminal when purchasing "VALUE" with a credit card.

FIG. 10A is a diagram illustrating an exemplary screen displayed on the card terminal when charging up the electronic money card with "VALUE".

FIG. 10B is a diagram illustrating another exemplary screen displayed on the card terminal when charging up the electronic money card with "VALUE".

FIG. 10C is a diagram illustrating still another exemplary screen displayed on the card terminal when charging up the electronic money card with "VALUE".

FIG. 14A is a diagram for explaining a variant.

FIG. 14B is a diagram for explaining another variant.

FIG. 14C is a diagram for explaining still another variant.

Figure 1:
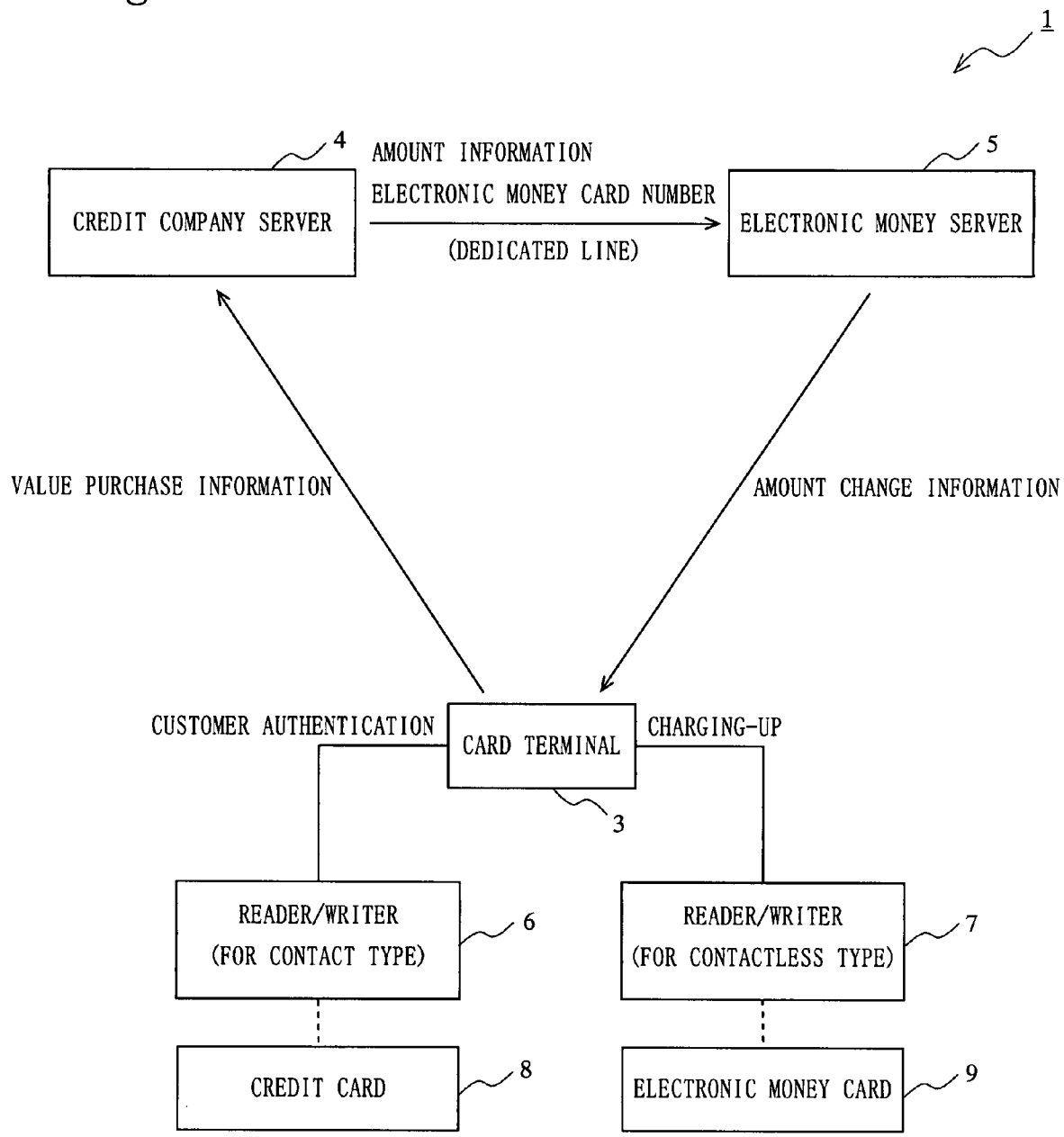
FIG. 1 is a block diagram illustrating an exemplary configuration of an electronic money charging-up system.

DESCRIPTION OF THE PREFERRED EMBODIMENTS (1) Outline of an Embodiment

In an electronic money charging-up system 1 (FIG. 1), a credit card 8 is used to purchase "VALUE", and an electronic money card 9 is charged up with the purchased "VALUE".

The "VALUE" as described herein is meant to indicate monetary information, which is equivalent in concept to cash in the operation of the electronic money, and represents the amount of monetary value by electronic data.

The credit card 8 is an IC card or a medium including an IC chip, and a personal identification number (PIN) for the credit card 8 is authenticated by a card terminal 3 via a reader/writer 6. As a result, a person who entered the PIN is locally authenticated as the owner of the credit card 8.

In addition, the card terminal 3 acquires an electronic money card number from an electronic money card 9 via a reader/writer 7. The electronic money card 9 is also an IC card or a medium including an IC chip.

The card terminal 3 transmits to a credit company server 4 an authentication result, amount information indicating an amount with which to charge up, a credit card number of the credit card 8, and an electronic money card number of the electronic money card 9.

Based on the authentication result, the credit company server 4 confirms that the user of the credit card 8 is a valid user, and identifies the user by the credit card number.

Then, the credit company server 4 transmits the amount information and the electronic money card number to an electronic money server 5. In addition, the credit company server 4 bills the user for the amount indicated by the amount information as a payment amount for purchasing "VALUE". That is, the credit company server 4 credits the user's account with the payment amount for purchasing "VALUE".

The electronic money server 5 receives the electronic money card number from the credit company server 4, and based on this, the electronic money server 5 identifies the electronic money card 9 that is to be charged up.

In addition, based on the amount information transmitted from the credit company server 4, the electronic money server 5 recognizes the amount with which to charge up, and stores the amount to a storage device.

The card terminal 3 requests the electronic money server 5 to charge up the electronic money card 9 by transmitting the electronic money card number acquired from the electronic money card 9 via the reader/writer 7.

Upon receipt of the electronic money card number from the card terminal 3, the electronic money server 5 acquires the amount with which to charge up the electronic money card 9 from the storage device, and generates amount change information for adding the amount with which to charge up to the amount of "VALUE".

Then, the electronic money server 5 transmits the generated amount change information to the card terminal 3.

The card terminal 3 receives the amount change information from the electronic money server 5, and inputs it to the electronic money card 9.

Based on the amount change information, the electronic money card 9 updates the amount of "VALUE" stored therein to an amount designated by the change information.

In this manner, the user can purchase "VALUE" by making a payment by the credit card 8, and can also charge up the electronic money card 9 with the purchased "VALUE".

Note that the card terminal 3 and the credit company server 4 are conventionally connected by a dedicated line because authentication information such as the PIN is transmitted/received on a network, but in the electronic money charging-up system 1, authentication information concerning the credit card 8 is not distributed on the network (and an authentication result is distributed instead), and therefore the credit company server 4 and the card terminal 3 can be connected by a general network such as the Internet. Thus, the card terminal 3 can be installed at low cost.

(2) Details of the Embodiment

FIG. 1 is a diagram illustrating an exemplary configuration of the electronic money charging-up system according to the present embodiment.

The electronic money charging-up system 1 includes components such as the card terminal 3, the credit company server 4, the electronic money server 5, the credit card 8, and the electronic money card 9.

These components will be described below.

The credit card 8 and the electronic money card 9 are owned by the user, and they are a contact-type IC card and a contactless-type IC card, respectively.

While the present embodiment will be described below by taking as an example the case where the credit card 8 is a contact-type IC card and the electronic money card 9 is a contactless-type IC card, various combinations are possible.

As will be described in detail later, it is possible to use media other than cards, e.g., cell phones and watches, which are embedded with an IC chip for carrying out the functions of the credit card 8 or the electronic money card 9. Alternatively, it is also possible to allow a single IC chip to have both the functions of the credit card 8 and the functions of the electronic money card 9.

Furthermore, the IC chips can be either of contact type or of contactless type.

The credit card 8 is a medium that has embedded therein an IC chip having various elements formed thereon, and constitutes a financial IC card issued by a financial institution.

The credit card 8 has stored therein a PIN, a credit card number, and other information, and performs information processing such as authentication of the PIN.

More specifically, the credit card 8 accepts an externally inputted PIN, and compares it with the PIN stored therein to perform a PIN authentication process. Then, the credit card 8 outputs an authentication result and the credit card number to the external.

Note that the credit card number constitutes card specification information for specifying the credit card 8.

FIG. 2A is a block diagram illustrating an exemplary hardware configuration of the credit card 8.

As shown in the figure, the credit card 8 includes elements such as a CPU (Central Processing Unit) 11, a contact terminal 12, a ROM (Read Only Memory) 13, a RAM (Random Access Memory) 14, and an EEPROM (Electrically Erasable and Programmable ROM) 15.

These elements are formed on the IC chip embedded in the credit card 8.

The CPU 11 is a central processing unit for performing information processing in accordance with programs stored in the ROM 13 and the EEPROM 15.

In the present embodiment, the CPU 11 performs communication processing with the card terminal 3 via the reader/writer 6 and authentication processing for an authentication number inputted from the card terminal 3, and outputs the authentication result to the card terminal 3. Also, in response to a request from the card terminal 3, the CPU 11 reads a credit card number from the storage device, and provides it to the card terminal 3.

The contact terminal 12 is exposed to the outside of the credit card 8, and plated with gold, for example. The contact terminal 12 is brought into contact with a contact terminal of the reader/writer 6 to electrically connect the credit card 8 with the card terminal 3.

By way of the contact terminal 12, the credit card 8 is supplied with power for driving itself, and transmits/receives data to/from the card terminal 3.

The RAM 14 is a randomly writable/readable memory for providing working memory for the CPU 11 to perform information processing.

The RAM 14 is capable of holding memory contents while the credit card 8 is being supplied with power, but when the power supply is stopped, the memory contents are lost.

The ROM 13 is a read-only memory having stored therein programs, parameters and data that are essential to the functions of the credit card 8.

These pieces of information are previously burned into the ROM 13, and it is normal not to write additional information and erase the pieces of information.

The EEPROM 15 is a ROM to/from which information can be written/erased. Information stored in the EEPROM 15 can be held even when the credit card 8 is not being supplied with power.

As such, the ROM 13 and the EEPROM 15 constitute a program/data storage area in the credit card 8.

The EEPROM 15 has stored therein, for example, an OS (Operating System), which is a basic program for allowing the credit card 8 to function, and an authentication program for authenticating the PIN.

The CPU 11 executes the authentication program to perform authentication processing for a PIN inputted from the card terminal 3.

The electronic money card 9 will be described next. The electronic money card 9 is also a medium that has embedded therein an IC chip having various elements formed thereon.

The electronic money card 9 performs a process for increasing/decreasing the amount of "VALUE" stored therein based on amount change information, and constitutes a monetary terminal for increasing/decreasing the amount of monetary value ("VALUE") stored therein based on the amount change information.

In addition, the electronic money card 9 has stored therein an electronic money card number unique thereto, and therefore the electronic money server 5 can identify the electronic money card 9 based on the electronic money card number.

The amount of "VALUE" can be updated in two manners, either by calculating the balance in the electronic money card 9 or by calculating the balance in another communication destination such as the electronic money server 5.

In the former case, a command is inputted to the electronic money card 9 to cause the electronic money card 9 to perform a calculation process therein. In this case, the command constitutes the amount change information.

While in the latter case, a changed amount of "VALUE" is inputted to the electronic money card 9 to cause the electronic money card 9 to overwrite the balance. In this case, the inputted balance of "VALUE" constitutes the amount change information.

Furthermore, it is possible to combine the above methods depending on the type of calculation, either addition or subtraction, and which method is to be employed is determined by system design.

As described above, the electronic money card 9 is capable of increasing/decreasing the amount of "VALUE" stored therein, which is correlated with cash so that "VALUE" can be circulated as an exchangeable value equivalent to cash.

FIG. 2B is a block diagram illustrating an exemplary hardware configuration of the electronic money card 9.

As shown in the figure, the electronic money card 9 includes elements such as a CPU 21, a high-frequency circuit 22, an antenna 26, a ROM 23, a RAM 24, and an EEPROM 25.

These elements are formed on the IC chip embedded in the electric money card 9. The antenna 26 is composed of an aerial wire, which is provided around a peripheral portion in the electronic money card 9 and has an end connected to the IC chip.

The CPU 21 is a central processing unit for performing information processing in accordance with programs stored in the ROM 23 and the EEPROM 25.

In the present embodiment, the CPU 21 performs communication processing with the card terminal 3 via the reader/writer 7, updates the amount of currently stored "VALUE" based on amount change information inputted from the card terminal 3, and provides the card terminal 3 with the current balance of "VALUE" and the electronic money card number.

The antenna 26 is an antenna for performing short-range wireless communication with an antenna included in the reader/writer 7.

The electronic money card 9 wirelessly obtains drive power from the reader/writer 7 via the antenna 26, and performs wireless communication.

The high-frequency circuit 22 converts a radio-frequency wave, which is transmitted from the reader/writer 7 to the antenna 26, into a digital signal, and outputs it to the CPU 21, or contrariwise, the high-frequency circuit 22 converts a digital signal outputted from the CPU 21 into a radio-frequency wave, and transmits it through the antenna 26 to the reader/writer 7.

The RAM 24 is a randomly writable/readable memory for providing working memory for the CPU 21 to perform information processing.

The RAM 24 is capable of holding memory contents while the electronic money card 9 is being supplied with power, but when the power supply is stopped, the memory contents are lost.

The ROM 23 is a read-only memory having stored therein programs, parameters and data that are essential to the functions of the electronic money card 9.

These pieces of information are previously burned into the ROM 23, and it is normal not to write additional information and erase the pieces of information.

The EEPROM 25 is a ROM to/from which information can be written/erased. Information stored in the EEPROM 25 can be held even when the electronic money card 9 is not being supplied with power.

As such, the ROM 23 and the EEPROM 25 constitute a program/data storage area in the electronic money card 9.

The EEPROM 25 has stored therein, for example, an OS (Operating System), which is a basic program for allowing the electronic money card 9 to function, a current balance of "VALUE" and log data, along with a VALUE processing program for performing processing related to "VALUE", such as updating of the amount of "VALUE" based on amount change information and providing the current balance of "VALUE".

The CPU 21 executes the VALUE processing program to perform charging-up with "VALUE" (addition of "VALUE") and settlement (subtraction of "VALUE").

Referring back to FIG. 1, the card terminal 3 is a terminal device installed at a location such as a hotel lobby, airport, shop, etc., and constitutes an IC card terminal.

The card terminal 3 is configured to be connectable to the credit company server 4 and the electronic money server 5 via a network such as the Internet.

Although only one card terminal 3 is shown in the figure, there may be a plurality of card terminals 3, each having its own unique card terminal ID. The credit company server 4 is capable of distinguishing among the card terminals 3 based on their respective card terminal IDs.

Note that the network for connecting the card terminal 3 to the credit company server 4 and the electronic money server 5 is not limited to the Internet, and any other networks such as a LAN (Local Area Network), a WAN (Wide Area Network) and a dedicated line network can be used for the connection.

In addition, by encryption based on, for example, SSL (Secure Sockets Layer) technology, it is made possible to enhance the security of a communication path between the card terminal 3 and the credit company server 4 and the security of a communication path between the card terminal 3 and the electronic money server 5.

The card terminal 3 is provided with the reader/writer 6 and the reader/writer 7. The reader/writer 6 has a contact terminal that is to be brought into contact with the contact terminal 12 of the credit card 8, and the physical contact with the contact terminal 12 allows the card terminal 3 to be electrically connected to the credit card 8.

On the other hand, the reader/writer 7 is provided with an antenna and a high-frequency circuit in order to perform short-range wireless communication with the electronic money card 9, so that the card terminal 3 can be electrically connected to the electronic money card 9.

The card terminal 3 has a function of accepting credit cards and a function of charging up electronic money cards.

Hereinbelow, these functions will be described.

[Credit Card Acceptance Function]

The card terminal 3 communicates with the credit card 8 via the reader/writer 6 to authenticate the PIN and acquire the credit card number.

For authenticating the PIN, the card terminal 3 accepts input of the PIN from the user, and inputs it to the credit card 8. Then, the card terminal 3 receives from the credit card 8 an authentication result as to whether the authentication is successful or not. As such, the card terminal 3 includes an authentication section for authenticating the user (owner) of the credit card 8.

In addition, the card terminal 3 requests the credit card 8 for its credit card number, and acquires the credit card number outputted from the credit card 8 responding to the request. As such, the card terminal 3 includes a card specification information acquisition section for acquiring card specification information from the credit card 8.

Furthermore, the card terminal 3 accepts the user to input an amount with which to charge up the electronic money card 9. Thus, the card terminal 3 acquires amount information specifying the amount with which to charge up. As such, the card terminal 3 includes an amount information acquisition section for acquiring amount information from authenticated users.

In addition, the card terminal 3 communicates with the credit card 8 to perform information processing as described above, and reads an electronic money card number from the electronic money card 9 via the reader/writer 7.

After acquiring various types of information in a manner as described above, the card terminal 3 transmits VALUE purchase information to the credit company server 4. The VALUE purchase information contains the authentication result, the credit card number, the electronic money card number, and the amount information. As such, the card terminal 3 includes a card information transmission section for transmitting the card specification information and the amount information to the credit company server 4 (a financial server).

After the card terminal 3 transmits the VALUE purchase information to the credit company server 4, the credit company server 4 performs billing, and communicates with the electronic money server 5 to transmit the amount information and the electronic money card number thereto.

The electronic money server 5 receives the amount information and the electronic money card number from the credit company server 4, and prepares for charging up the electronic money card 9.

[Electronic Money Card Charging-Up Function]

The card terminal 3 inquires of the user as to whether to charge up.

When the user wishes to charge up, the card terminal 3 transmits the electronic money card number to the electronic money server 5 to inquire whether the electronic money card 9 currently has any "VALUE" that is available for the charging-up, and if there is any "VALUE" that is available for the charging-up, the card terminal 3 receives the amount of "VALUE" and presents it to the user.

When the user confirms the presented amount and instructs the card terminal 3 to execute the charging-up, the card terminal 3 requests the electronic money server 5 for amount change information.

Then, the card terminal 3 receives (at an amount change information reception means) amount change information transmitted from the electronic money server 5 responding to the request, and inputs (with an input means) the received amount change information to the electronic money card 9 via the reader/writer 7.

Upon completion of the charging-up, the card terminal 3 notifies as such to the electronic money server 5, and reads a post-charging-up amount from the electronic money card 9 for presentation to the user.

Based on this presentation, the user can confirm that the electronic money card 9 has been charged up with the "VALUE".

Note that it is also possible to set a password for charging up the electronic money card 9.

The purpose of this is to allow the electronic money server 5 to determine whether the requester of the charging-up of the electronic money card 9 is a valid owner of the electronic money card 9 (i.e., an owner previously registered with the electronic money server 5).

In this case, the card terminal 3 causes the user to enter a password, and transmits it to the electronic money server 5, and the electronic money server 5 checks whether the password matches a password set for the electronic money card number of the electronic money card 9.

When the password does not match, the charging-up is not performed.

In the present embodiment, the credit card 8 is used to purchase "VALUE" from the credit company server 4, and immediately thereafter the electronic money server 5 charges up the electronic money card 9 with the purchased "VALUE". However, the credit company server 4 and the electronic money server 5 are independent of each other, and therefore the electronic money server 5 does not have to perform the charging-up immediately after the "VALUE" is purchased with the credit card 8. This will be described later in connection with variants.

Also by means other than by purchasing "VALUE" with the credit card 8, the electronic money server 5 can prepare "VALUE" with which to charge up the electronic money card 9.

For example, the card terminal 3 can perform, via the electronic money server 5, the charging-up with "VALUE" obtained by the user redeeming points from the user's point account or "VALUE" purchased by the user from other sources.

In this case, the user places the electronic money card 9 in the card terminal 3 to inquire of the electronic money server 5 as to an amount of "VALUE" that is currently available for the charging-up, and charges up the electronic money card 9 with "VALUE" that is available for the charging-up. As such, the card terminal 3 does not always require the credit card 8 for charging up the electronic money card 9.

Figure 3:
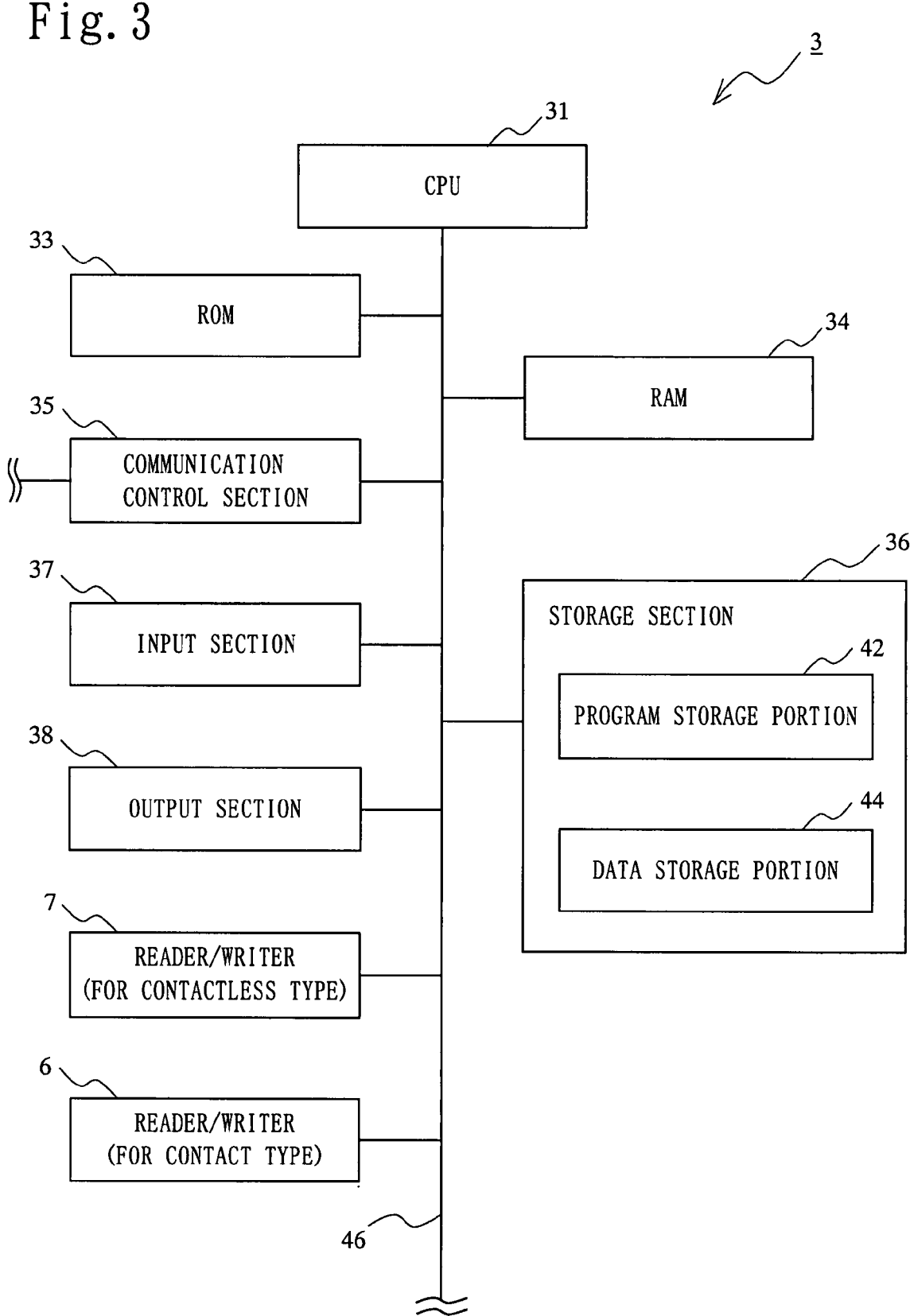
FIG. 3 is a block diagram illustrating an exemplary hardware configuration of a card terminal.

FIG. 3 is a block diagram illustrating an exemplary hardware configuration of the card terminal 3.

As shown in FIG. 3, the card terminal 3 includes a CPU 31, a ROM 33, a RAM 34, a communication control section 35, a storage section 36, an input section 37, an output section 38, the reader/writer 7 and the reader/writer 6, which are connected together by a path line 46.

The CPU 31 performs information processing in accordance with predetermined programs, and controls the entire card terminal 3.

In the present embodiment, the CPU 31 communicates with the credit card 8 and the credit company server 4 to carry out the credit card acceptance function, or communicates with the electronic money card 9 and the electronic money server 5 to carry out the electronic money card charging-up function.

The ROM 33 is a read-only memory having stored therein, for example, programs and parameters that are essential to the operation of the card terminal 3.

The RAM 34 is a randomly writable/readable memory for providing working memory for the CPU 31 and loading and storing programs and data that are stored in the storage section 36.

The communication control section 35 is a connection device for connecting the card terminal 3 to a network, so that the card terminal 3 can connect to the credit company server 4 and the electronic money server 5 via the communication control section 35.

The storage section 36 is composed of, for example, a hard disk or another type of storage medium, and a drive unit for driving such disk or medium, and specifically the storage section 36 includes a program storage portion 42 having various programs stored therein and a data storage portion 44 having data stored therein.

The program storage portion 42 has stored therein an OS, which is a basic program for operating the card terminal 3, and programs for causing the CPU 31 to carry out the credit card acceptance function and the electronic money card charging-up function.

In addition, the data storage portion 44 stores, for example, log data concerning information processing performed on the credit card 8 and the electronic money card 9.

The input section 37 includes input devices, such as a keyboard, a touch panel and a mouse, by which the user inputs information.

The user operates the input devices to input to the card terminal 3 the PIN for the credit card 8, an amount that is to be purchased for charging up, and other information.

The output section 38 includes, for example, a liquid crystal display, a CRT (Cathode-ray Tube) display, a plasma display, or another type of display device. The display device displays various screens for presenting contents of instructions to the user and matters that are to be confirmed.

In addition, the output section 38 may include an audio output device such as a loudspeaker so as to output, in audio format, the contents of instructions to the user and the matters that are to be confirmed.

The reader/writer 6 and the reader/writer 7 are configured as described earlier.

The credit company server 4 (FIG. 1) will be described next.

The credit company server 4 constitutes a financial server, and has a billing function for billing the user upon acceptance of VALUE purchase information from the card terminal 3, and a purchase notification function for notifying the electronic money server 5 about acceptance of the VALUE purchase information from the user.

[Billing Function]

The credit company server 4 receives VALUE purchase information from the card terminal 3, and acquires, from the received information, an authentication result, a credit card number, an electronic money card number and amount information. This function corresponds to a card information acquisition means.

Thereafter, the credit company server 4 first confirms the authentication result for the PIN. If the authentication result is successful, the rest of the procedure will be performed, whereas if the authentication result is unsuccessful, the credit company server 4 transmits an error message to the card terminal 3, and terminates the procedure.

While in the present embodiment, the authentication result is determined by the credit company server 4, this is not restrictive and the determination can be made by the card terminal 3.

In such a case, the card terminal 3 receives and confirms an authentication result from the credit card 8. If the authentication result is successful, the card terminal 3 transmits the VALUE purchase information to the credit company server 4, whereas if the authentication result is unsuccessful, the card terminal 3 presents an error message to the user, and terminates the rest of the procedure.

When the authentication result is successful, the credit company server 4 refers to a registered user database, and identifies the user based on the credit card number.

Then, the credit company server 4 determines whether the user's account can be credited. If the crediting is possible, processing as described below is performed, whereas if the crediting is not possible, the card terminal 3 is notified as such.

FIG. 4A illustrates an exemplary logical configuration of the registered user database.

The registered user database is a database having stored therein user registration information, and containing personal information concerning users registered with the credit company at the time of acquisition of the credit card 8.

As shown in FIG. 4A, the registered user database contains "credit card numbers", "PINs", "names", "billing accounts", and other items.

The item "credit card numbers" indicates credit card numbers unique to the respective credit cards 8 issued to the users.

The item "PINs" indicates PINs that are set for the credit cards 8, and used by the respective credit cards 8 for PIN authentication. The same values are stored in the respective credit cards 8.

The item "names" indicates the names of the users.

The item "billing accounts" indicates information for identifying financial accounts from which amounts billed to the users are withdrawn, and the information contains, for example, account numbers for bank accounts designated by the users, and names of account holders.

In addition, the user registration information contains personal information of the users, e.g., registration dates, addresses of the users, occupations, places of work, phone numbers, and expiration dates of the credit cards 8.

The credit company server 4 is capable of identifying a user by comparing the credit card number contained in the user registration information configured as described above with a credit card number received from the card terminal 3.

After identifying the user, the credit company server 4 confirms the user's credit status by referring to a database (not shown), which has recorded users' credit quotas and statuses of use of the quotas, and determines whether it is possible to credit the user's account with an amount specified by amount information.

If the crediting is possible, the user is billed, whereas if the crediting is not possible, the credit company server 4 notifies as such to the card terminal 3.

The credit company server 4 bills the user by recording billing information to the billing database. As such, the credit company server 4 includes a billing means.

FIG. 4B illustrates an exemplary logical configuration of the billing database.

The billing database is a database in which credit card numbers are correlated with billing amounts, and contains items such as "credit card numbers", "billed amounts", "card terminal IDs" and "dates and times".

For the item "credit card numbers", credit card numbers acquired from VALUE purchase information are recorded.

For the item "billed amounts", amounts specified by amount information acquired from the VALUE purchase information are recorded.

For the item "card terminal IDs", ID information for card terminals 3 is recorded. Each card terminal 3 has stored therein unique ID information for identifying the card terminal 3, and notifies the ID information to the credit company server 4 to communicate with the credit company server 4.

For the item "dates and times", dates and times at which charging-up request information has been received from the card terminals 3 are recorded.

The billing database is updated by an additional record each time the credit card 8 is billed.

In this manner, the billing is performed by the credit company server 4 upon receipt of the VALUE purchase information from the card terminal 3.

For the billing process, a cutoff date is set approximately per month, and the credit company server 4 totals, for each credit card number, amounts that have been billed up to the cutoff date, and charges the total of billed amounts to the billing account registered with the registered user database.

[Purchase Notification Function]

The credit company server 4 is connected to the electronic money server 5 via a dedicated line or the like, and the credit company server 4, after billing the user, transmits the amount information and the electronic money card number to the electronic money server 5.

The credit company server 4 is a server device for authenticating the owner of the electronic money card 9, and the credit company server 4 transmits to the electronic money server 5 owner identification information for identifying the authenticated owner, i.e., electronic money card information (transmitted from the card terminal 3 and correlated with a credit card number). As such, the credit company server 4 includes a card information providing section. In addition, the electronic money server 5 constitutes an amount change information transmission section for transmitting amount change information to the electronic money card 9.

The transmission process is performed in real time upon each billing because it is assumed that the user charges up the electronic money card 9 immediately after purchasing "VALUE" with the credit card 8.

By transmitting the amount information and the electronic money card number to the electronic money server 5, the credit company server 4 can notify the electronic money server 5 that the user's account has been credited. By crediting the user's account, the credit company advances payment for "VALUE" purchased by the user. This is the same as in the case of usual shopping with a credit card.

Figure 5:
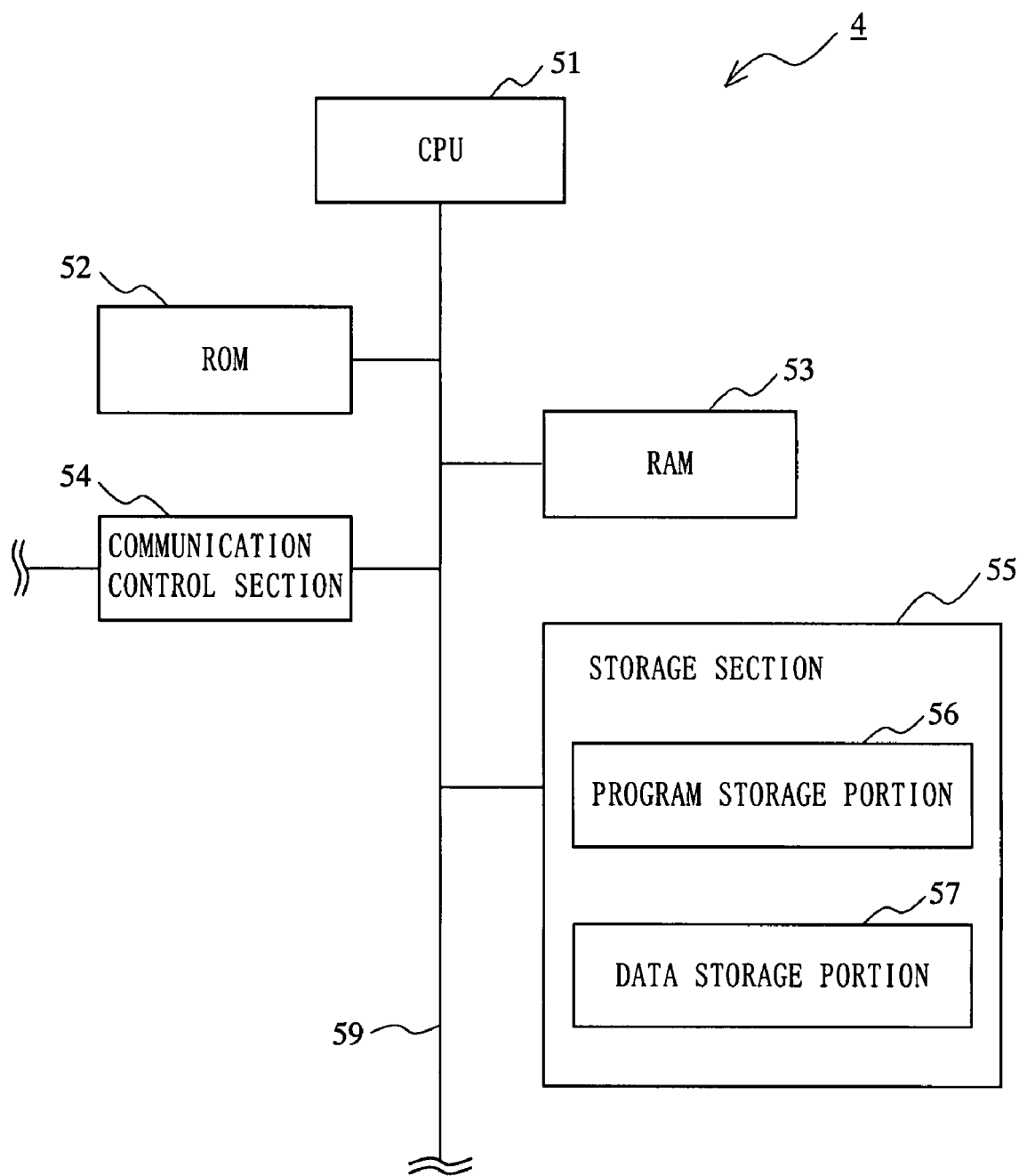
FIG. 5 is a block diagram illustrating an exemplary hardware configuration of the credit company server.

FIG. 5 is a block diagram illustrating an exemplary hardware configuration of the credit company server 4.

As shown in FIG. 5, the credit company server 4 includes a CPU 51, a ROM 52, a RAM 53, a communication control section 54, and a storage section 55, which are connected together by a path line 59.

The CPU 51 performs information processing in accordance with predetermined programs, and controls the entire credit company server 4.

In the present embodiment, the CPU 51 communicates with the card terminal 3 to carry out the billing function, and also communicates with the electronic money server 5 to carry out the purchase notification function.

The ROM 52 is a read-only memory having stored therein, for example, programs and parameters that are essential to the operation of the credit company server 4.

The RAM 53 is a randomly writable/readable memory for providing working memory for the CPU 51 and loading and storing programs and data that are stored in the storage section 55.

The communication control section 54 is a connection device for connecting the credit company server 4 to a network, so that the credit company server 4 can connect to the card terminal 3 and the electronic money server 5 via the communication control section 54.

The storage section 55 is composed of, for example, a hard disk or another type of storage medium, and a drive unit for driving such disk or medium, and specifically the storage section 55 includes a program storage portion 56 having various programs stored therein and a data storage portion 57 having data stored therein.

The program storage portion 56 has stored therein, for example, an OS, which is a basic program for operating the credit company server 4, and programs for causing the CPU 51 to carry out the billing function and the purchase notification function.

In addition, the data storage portion 57 has stored therein, for example, the registered user database, a database for managing credit quotas, and the billing database.

Next, the electronic money server 5 (FIG. 1) will be described.

The electronic money server 5 has a charging-up preparation function for preparing for charging up upon receipt of a notification from the credit company server 4, and a charging-up function for charging up the electronic money card 9.

[Charging-Up Preparation Function]

The electronic money server 5 receives the amount information and the electronic money card number from the credit company server 4, and prepares for charging up the electronic money card 9.

The preparation is made by first checking the electronic money card number received from the credit company server 4 against the registered user database to identify the electronic money card 9 of the user, and then registering an amount with which to charge up with a charging-up preparation database.

FIG. 6A illustrates an exemplary logical configuration of the registered user database.

The registered user database is a database having stored therein user registration information, and the users register user registration information with a business entity (an electronic money company), which manages electronic money, at the time of acquiring the electronic money card 9.

The registered user database contains items such as "electronic money card numbers", "user names", "passwords", and other items.

The item "electronic money card numbers" indicates numbers unique to the respective electronic money cards 9 issued to the users.

The item "user names" indicates the names of the users.

The item "passwords" indicates passwords that are used, when necessary, for the electronic money server 5 to authenticate the users.

FIG. 6B illustrates an exemplary logical configuration of the charging-up preparation database.

The charging-up preparation database contains items such as "electronic money card numbers", "amounts", "expiration dates", and "charging-up".

The item "electronic money card numbers" indicates electronic money card numbers for electronic money cards that are to be charged up.

The item "amounts" indicates amounts with which to charge up the electronic money cards.

The item "expiration dates" indicates time limits for charging-up. If the user does not perform charging-up before a time limit, an amount associated with the time limit is returned to a bank account designated by the user.

The item "charging-up" indicates flag information as to whether the user has performed the charging-up. The flag information is set to "completed" when the user has already performed the charging-up, while it is set as "not completed" until the charging-up is performed.

After confirming the electronic money card number of the electronic money card 9 against the registered user database, the electronic money server 5 inputs the above items to the charging-up preparation database, and completes the preparation for charging up with "VALUE".

[Charging-Up Function]

To charge up the electronic money card 9, the electronic money server 5 transmits the amount change information to the electronic money card 9 in response to a request from the card terminal 3 in a manner as shown below.

First, the electronic money server 5 receives an electronic money card number of the electronic money card 9 from the card terminal 3.

Then, the electronic money server 5 searches the charging-up preparation database for the electronic money card number to check whether there is any "VALUE" left unused for charging-up.

Specifically, whether the charging-up preparation database contains the electronic money card number that is to be retrieved, and if the database contains the electronic money card number, it is checked whether the item "charging-up" indicates "not completed" for that number.

If the item "charging-up" indicates "not completed", an amount recorded for the item "amounts" is used for the charging-up.

After confirming with the charging-up preparation database that there is any "VALUE" prepared for use in the charging-up, the electronic money server 5 generates amount change information for adding the amount of "VALUE" recorded for the item "amounts", and transmits it to the card terminal 3.

The card terminal 3 receives the amount change information, and inputs it to the electronic money card 9 to charge up the electronic money card 9.

When the charging-up is successful, the electronic money card 9 transmits a notification indicating as such to the electronic money server 5 via the card terminal 3, and the electronic money server 5 receives the notification, and updates the item "charging-up" in the charging-up preparation database to "completed", thereby completing the process.

The hardware configuration of the electronic money server 5 is basically the same as that of the credit company server 4.

However, in the case of the electronic money server 5, the program storage portion 56 has stored therein, for example, an OS, which is a basic program for operating the electronic money server 5, and programs for causing the CPU 51 to carry out the charging-up preparation function and the charging-up function.

In addition, the data storage portion 57 has stored therein, for example, the registered user database and the charging-up preparation database.

Next, a procedure for the user to purchase "VALUE" with the credit card 8 will be described with reference to a flowchart in FIG. 7.

First, the user places the credit card 8 in the reader/writer 6, so that the card terminal 3 establishes a communication path to the credit card 8.

Next, the card terminal 3 requests the user to input a PIN and a purchase amount of "VALUE". Then, the card terminal 3 inputs the PIN inputted by the user to the credit card 8 (step 5).

The credit card 8 accepts the input of the PIN from the card terminal 3, and checks the PIN against internally stored PINs to authenticate the PIN (step 10).

Then, the credit card 8 outputs an authentication result to the card terminal 3 (step 15).

Furthermore, the card terminal 3 requests the credit card 8 for its credit card number, and acquires it.

Next, the card terminal 3 requests the electronic money card 9 for its electronic money card number, and in response to this, the electronic money card 9 outputs the electronic money card number to the card terminal 3 (step 17).

Next, the card terminal 3 transmits to the credit company server 4 VALUE purchase information as acquired above, which contains the amount information (the purchased amount of "VALUE"), the credit card number, the electronic money card number and the authentication result (step 20). By simultaneously transmitting the credit card number and the electronic money card number to the credit company server 4 as described above, the card terminal 3 can correlate the two numbers in the credit company server 4.

The credit company server 4 receives the VALUE purchase information from the card terminal 3, and acquires the authentication result, the credit card number, the amount information, etc., from the received information.

After confirming that the authentication result is successful, the credit company server 4 records the credit card number, the amount information, and other items to the billing database, and performs a process for billing the user (step 25).

After the billing process, the credit company server 4 transmits the amount information and the electronic money card number to the electronic money server 5 (step 30).

The electronic money server 5 receives these pieces of information from the credit company server 4. Then, the electronic money server 5 searches the registered user database for the electronic money card number to identify the electronic money card 9.

Thereafter, the electronic money server 5 records the electronic money card number, the amount information, and other information to the charging-up preparation database (and sets the item "charging-up" to "not completed"), thereby completing the preparation for charging up the electronic money card 9 (step 35).

With the above procedure, the user can purchase "VALUE" with the credit card 8, and make the purchased "VALUE" prepared for charging-up in the electronic money server 5.

Next, a procedure up to the point where the user charges up the electronic money card 9 with "VALUE" will be described with reference to a flowchart in FIG. 8.

First, the card terminal 3 requests the electronic money card 9 for its electronic money card number, and in response to this, the electronic money card 9 outputs the electronic money card number to the card terminal 3 (step 50). Note that the card terminal 3 has already acquired the electronic money card number in step 17, and therefore the acquired number may be used here.

The card terminal 3 acquires the electronic money card number from the electronic money card 9, and transmits it to the electronic money server 5 (step 55).

The electronic money server 5 receives the electronic money card number from the card terminal 3, and checks it against the registered user database (step 60).

If necessary, the electronic money server 5 causes the user to input a password with the card terminal 3, and checks the correspondence between the electronic money card number and the password.

Next, the electronic money server 5 searches the charging-up preparation database for the electronic money card number to check whether there is any "VALUE" that is available for charging-up.

If there is any "VALUE" that is available for charging-up, the electronic money server 5 transmits the amount of "VALUE" that is available for charging-up (i.e., the amount recorded for the item "amounts") to the card terminal 3 (step 65).

The card terminal 3 receives the amount available for charging-up from the electronic money server 5, and presents it to the user. Then, the user confirms the amount.

After the user confirms the amount, the card terminal 3 transmits to the electronic money server 5 a notification indicating that the amount has been confirmed (step 70).

Upon receipt of the notification from the card terminal 3, the electronic money server 5 generates amount change information for charging up with the amount of "VALUE" that is available for charging-up (step 75), and transmits it to the card terminal 3 (step 80).

The card terminal 3 receives the amount change information from the electronic money server 5 (step 85), and inputs it to the electronic money card 9 (step 90).

The electronic money card 9 receives the amount change information from the card terminal 3, and updates the amount of currently stored "VALUE" to a post-charging-up amount based on the received information (step 95).

Although not shown in the flowchart, the electronic money card 9, after updating the amount, outputs an update completion notification and the updated amount of "VALUE" to the card terminal 3.

The card terminal 3 presents the updated amount to the user, and transmits the update completion notification to the electronic money server 5.

The electronic money server 5 receives the update completion notification from the card terminal 3 to recognize that the charging-up with "VALUE" has been completed, and updates the item "charging-up" in the charging-up preparation database from "not completed" to "completed".

With the above procedure, the electronic money server 5 can charge up the electronic money card 9 with "VALUE" prepared for charging-up.

Next, screens presented to the user by the card terminal 3 will be described.

FIGS. 9A and 9B are diagrams each illustrating an exemplary screen displayed on the card terminal 3 when purchasing "VALUE" with the credit card 8.

FIG. 9A is a diagram illustrating an exemplary menu screen displayed on the card terminal 3.

The card terminal 3 provides various services including purchase of "VALUE" with the credit card 8, so that the user can select a desired service from among them.

In the example of FIG. 9A, a button 71 for purchasing "VALUE" with a credit card and a balance inquiry button 72 are displayed, and the user can select a desired service by touching a button associated with the service.

The user can start the process of purchasing "VALUE" with the credit card 8 by touching the VALUE purchase button 71.

Note that the balance inquiry button 72 is to be selected to check the balance of "VALUE" currently stored in the electronic money card 9.

FIG. 9B illustrates a VALUE purchase screen, which is displayed when the purchase button 71 on the menu screen in FIG. 9A is selected. This screen is displayed in step 5 of the flowchart in FIG. 7.

The VALUE purchase screen displays, for example, the instruction "Please place credit card and electronic money card, and enter PIN and purchase amount of 'VALUE'", thereby instructing the user to place the credit card 8 and the electronic money card 9 in the reader/writers 6 and 7, respectively, and enter a PIN and a purchase amount of "VALUE".

In accordance with the instruction, the user places the credit card 8 and the electronic money card 9 in the reader/writers 6 and 7, respectively.

The VALUE purchase screen contains a PIN input field 75, a purchase amount input field 76, and a "TRANSMIT" button 77, and the user enters a PIN for the credit card 8 in the PIN input field 75, and a purchase amount of "VALUE" in the purchase amount input field 76.

These numerical values can be entered by the user operating an unillustrated keyboard or touch panel.

When the user enters the PIN in the PIN input field 75, filled circles, rather than the entered PIN itself, are displayed in accordance with digits of the entered number. Thus, it is possible to prevent the PIN from being seen by any third party.

After entering the values, the user selects the "TRANSMIT" button 77.

Figure 7:
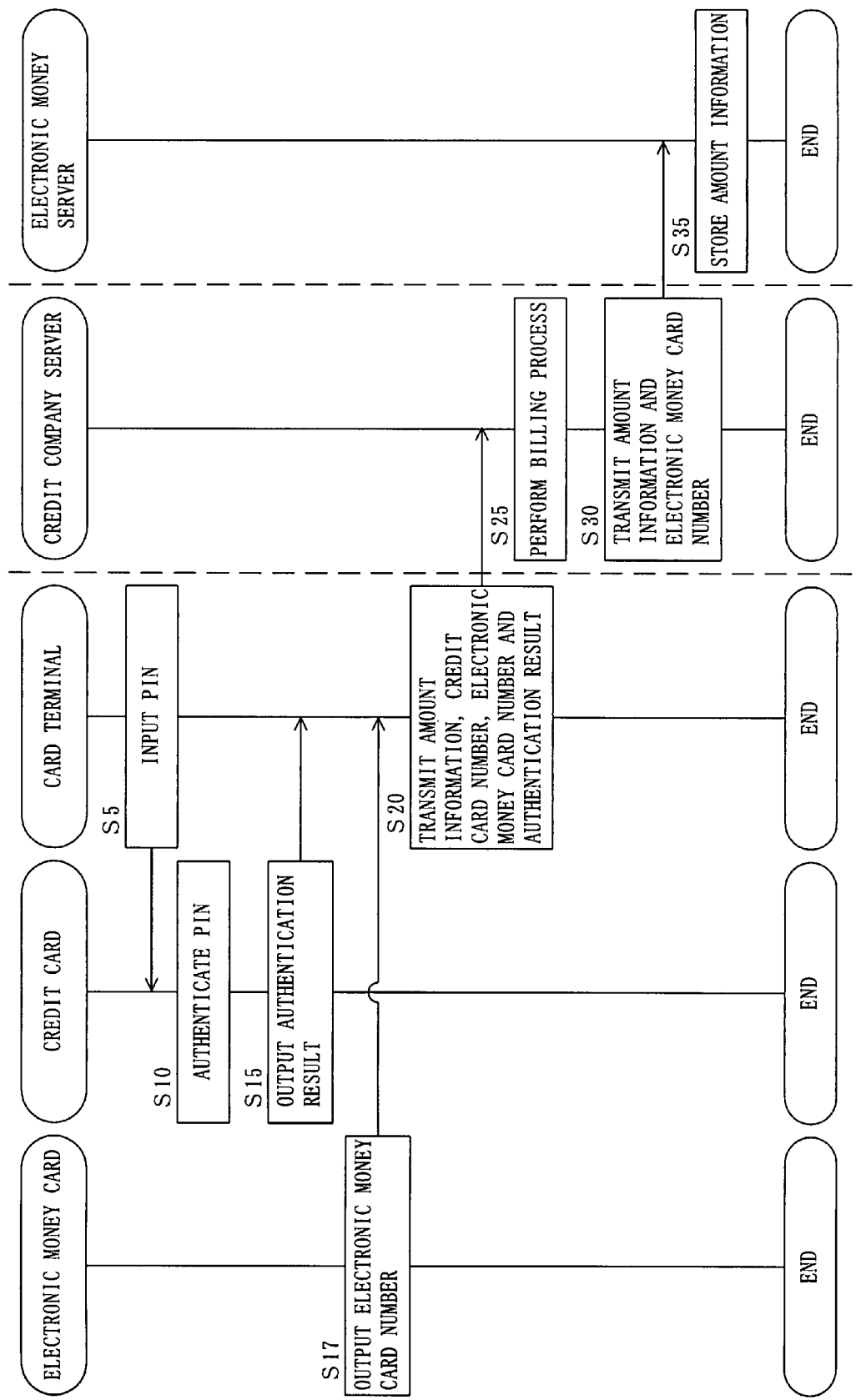
FIG. 7 is a flowchart for explaining the procedure for purchasing "VALUE" with a credit card.

When the "TRANSMIT" button 77 is selected, the card terminal 3 authenticates the PIN (steps 10 and 15 in FIG. 7), and transmits an authentication result, amount information, a credit card number and an electronic money card number to the credit company server 4 (step 20 in FIG. 7).

FIGS. 10A, 10B and 10C are diagrams each illustrating an exemplary screen displayed on the card terminal 3 when charging up the electronic money card 9 with purchased "VALUE".

FIG. 10A illustrates a charging-up screen, which is displayed after selecting the "TRANSMIT" button 77 on the VALUE purchase screen in FIG. 9B. This screen is displayed in step 50 of the flowchart in FIG. 8. Note that it is assumed herein that a password is required for charging up the electronic money card 9.

The charging-up screen displays, for example, the instruction "Please place electronic money card and enter password", thereby instructing the user to ensure that the electronic money card 9 is placed and a password is entered. Then, the card terminal 3 reads an electronic money card number from the electronic money card 9 (step 50 in FIG. 8).

In addition, the charging-up screen displays a password input field 80 and a "TRANSMIT" button 81.

In accordance with the instruction, the user ensures that the electronic money card 9 is placed in the reader/writer 7, and thereafter the user enters a password in the password input field 80 and selects the "TRANSMIT" button 81.

Note that in the password input field 80, filled circles are displayed in accordance with the password entered by the user.

Figure 8:
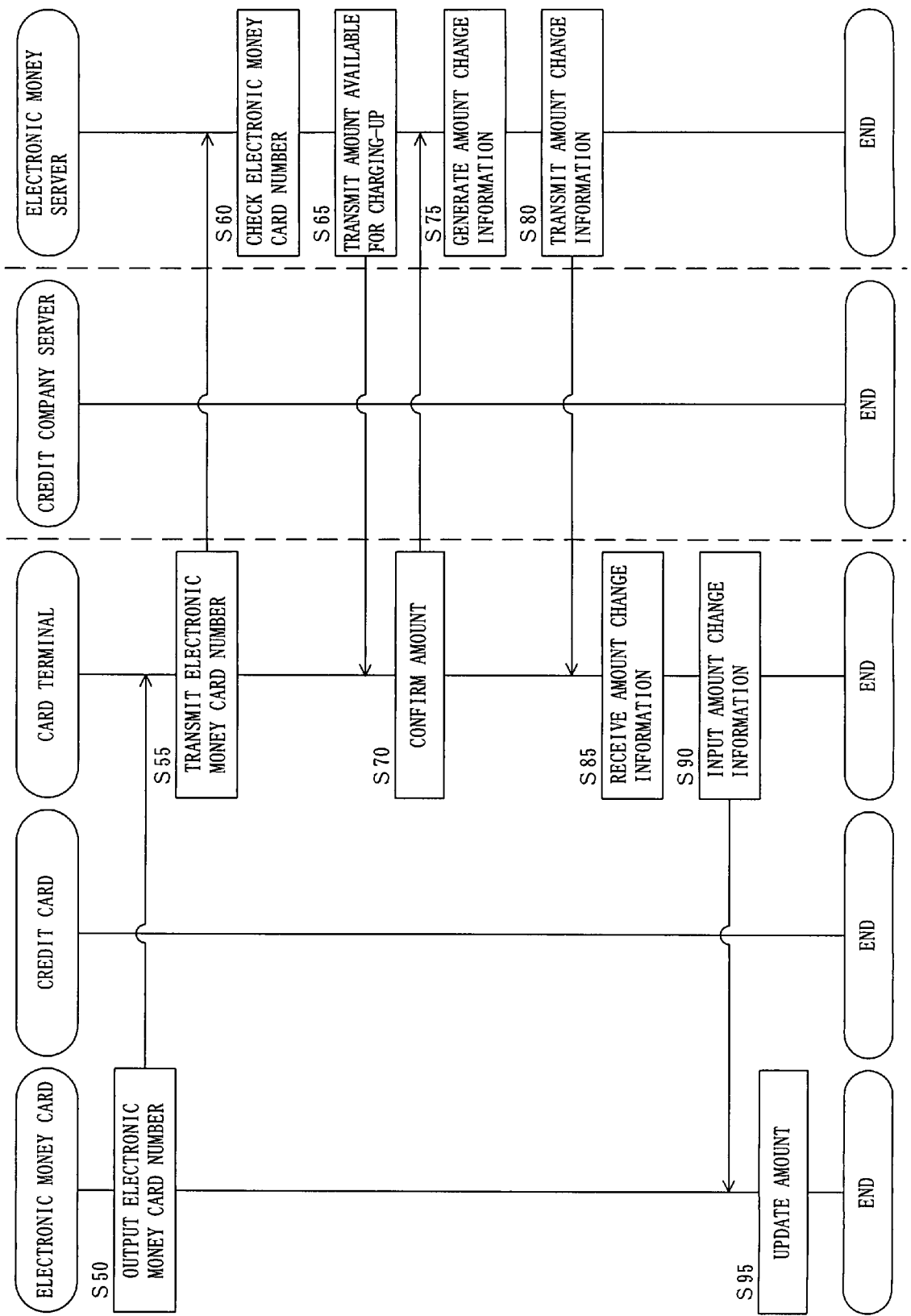
FIG. 8 is a flowchart for explaining the procedure for charging up the electronic money card with "VALUE".

When the "TRANSMIT" button 81 is selected, the card terminal 3 transmits the electronic money card number and the password to the electronic money server 5 (step 55 in FIG. 8), and the electronic money server 5 transmits an amount available for charging-up to the card terminal 3 (step 65 in FIG. 8).

FIG. 10B illustrates an exemplary amount confirmation screen for displaying the amount available for charging-up that is transmitted from the electronic money server 5. This screen is displayed in step 70 of the flowchart in FIG. 8.

The amount confirmation screen presents an amount that is currently available for charging-up by displaying, for example, "amount available for charging-up: ¥2,000", and also presents, for example, the question "Would you like to charge up?" to confirm whether the user wishes to charge up.

The charging-up screen contains a button 83 labeled "YES" and a button 84 labeled "NO", and the user selects the button 83 for performing charging-up or the button 84 for not performing charging-up.

Even after selecting the button 84, the user is still able to charge up at a later time.

FIG. 10C illustrates an exemplary charging-up completion screen for notifying the user that the charging-up has been completed. This screen is displayed in step 95 of the flowchart in FIG. 8.

The charging-up completion screen presents an amount used for charging-up by displaying, for example, "charged up with ¥2,000", and also presents the balance of "VALUE" after the charging-up by displaying, for example, "The balance after charging-up is ¥3,000".

In the above-described electronic money charging-up system 1 according to the present embodiment, the PIN for the electronic money card 9 can be locally authenticated by the card terminal 3, and furthermore depending on a result for the authentication, it is made possible to purchase "VALUE" with the credit card 8 based on the user's credit. Thus, the electronic money card 9 can be charged up with the purchased "VALUE".

In the above embodiment, the credit card 8 is used for purchasing "VALUE", but it is also possible to use other financial IC cards to purchase "VALUE".

For example, an IC card provided as a bank cash card can be used to purchase "VALUE".

In this case, billing can be made by withdrawing from the user's bank account.

Also, in the above embodiment, the credit company server 4 transmits the electronic money card number to the electronic money server 5, but the present invention is not limited to the electronic money card number. Any information can be used so long as the information identifies the owner (user) authenticated by the credit company server 4. The electronic money server 5 charges up an electronic money card 9 having an electronic money card number correlated with the owner.

For example, the registered user database in the electronic money server 5 may correlate (associate) the electronic money card number of the electronic money card 9 with the credit card number of the credit card 8, and the credit company server 4 may transmit the credit card number to the electronic money server 5.

In this case, the electronic money server 5 searches the registered user database for the credit card number received from the credit company server 4 to identify the electronic money card 9 that is to be charged up.

Alternatively, the credit company server 4 may correlate credit card numbers with their corresponding electronic money card numbers, and transmit to the electronic money server 5 an electronic money card number corresponding to a credit card number received from the card terminal 3.

In this case, the card terminal 3 can transfer the electronic money card number to the electronic money server 5 by transmitting the credit card number to the credit company server 4, and therefore it is possible to eliminate the necessity of transmitting the electronic money card number to the credit company server 4.

In the above-described embodiment, the card terminal 3 is used to sequentially perform purchase of "VALUE" and charging-up with the purchased "VALUE", but it is also possible to charge up the electronic money card 9 with the purchased "VALUE" at any later time.

Figure 11:
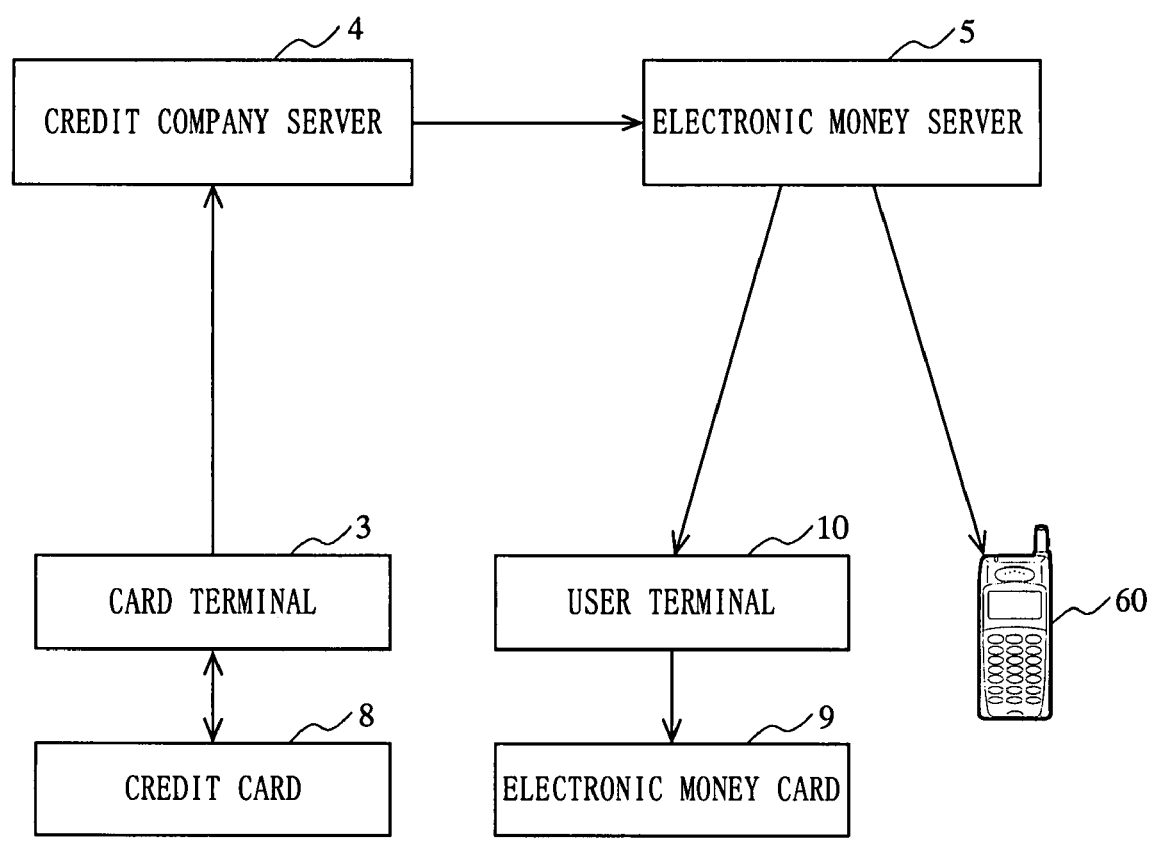
FIG. 11 is a diagram for explaining variants.

Referring to FIG. 11, the case where the user performs charging-up at home will now be described.

A user terminal 10 shown in FIG. 11 is composed of, for example, a personal computer connectable to the Internet and a reader/writer 7 provided therewith.

First, the user places the credit card 8 in the card terminal 3, and purchases "VALUE" from the credit company server 4. Thereafter, the user places the electronic money card 9 in the user terminal 10 at home, and connects to the electronic money server 5 to charge up the electronic money card 9 with the purchased "VALUE".

In this manner, the user can acquire "VALUE" purchased with the credit card 8 in the card terminal 3, at a later time, from a terminal device different from the card terminal 3.

In addition to the personal computer, it is also possible to use any mobile terminal having a function for processing "VALUE" as the terminal device.

FIG. 11 also shows the case where a cell phone 60 is used for charging up with "VALUE".

The cell phone 60 has a function of connecting to the Internet and functions similar to those of the electronic money card 9.

After purchasing "VALUE" with the credit card 8, the user uses the cell phone 60 to access the electronic money server 5, and charges up the cell phone 60 with the purchased "VALUE".

Figure 12:
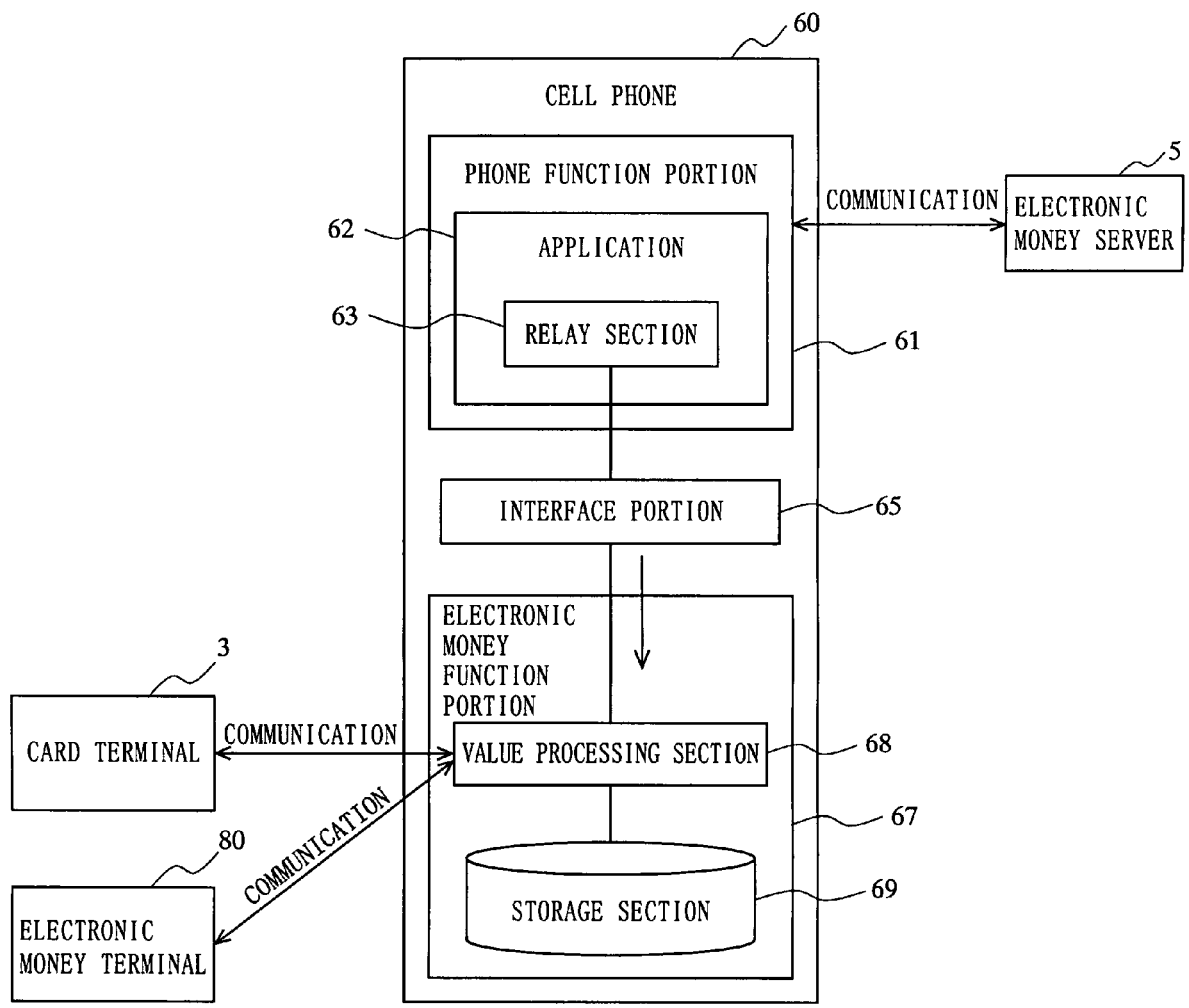
FIG. 12 is a block diagram illustrating an exemplary functional configuration of a cell phone.

FIG. 12 is a block diagram illustrating an exemplary functional configuration of the cell phone 60.

As shown in FIG. 12, the cell phone 60 includes a phone function portion 61, which carries out a function as an Internet connectable cell phone, an electronic money function portion 67, which is composed of a contactless-type IC chip similar to that included in the electronic money card 9 and carries out a function for processing electronic money, and an interface portion 65, which connects the two portions.

The cell phone 60 constitutes a monetary terminal with the electronic money function portion 67 capable of carrying out the function of processing electronic money in the same manner as the electronic money card 9.

The phone function portion 61 is capable of wireless communication with a base station for the cell phone 60, and connecting via the base station to a telephone line network (to make a call) or to the Internet (to access the electronic money server 5).

The phone function portion 61 has an application 62 installed therein. The application 62 provides various services related to electronic money, and includes a relay section 63 for accessing the electronic money function portion 67 via the interface portion 65.

The application 62 has a function of accessing the electronic money function portion 67 and presenting to the user information stored in the electronic money function portion 67, e.g., an electronic money card ID, the balance of "VALUE" and log data.

Furthermore, the application 62 communicates with the electronic money server 5 via the Internet.

Thus, it is possible to transmit to the electronic money server 5 the electronic money card ID and the balance of "VALUE" that are stored in the electronic money function portion 67 or to input amount change information, which is transmitted from the electronic money server 5, to the electronic money function portion 67.

Although not shown in the figure, as in the case of the electronic money card 9, the electronic money function portion 67 is composed of an antenna and a contactless-type IC chip having formed thereon elements such as a. CPU, a ROM, a RAM, an EEPROM and a high-frequency circuit, and the CPU executes a predetermined program to form a VALUE processing section 68 and a storage section 69 as shown in FIG. 12.

The storage section 69 has stored therein the electronic money card ID, the balance of "VALUE", log data, etc.

The VALUE processing section 68 outputs the electronic money card ID and the balance of "VALUE" in accordance with an instruction from an external communication destination, or receives amount change information from an external communication destination to update the balance of "VALUE".

Examples of the communication destination of the VALUE processing section 68 include the card terminal 3, the electronic money server 5, and an electronic money terminal 80 installed at a store or the like.

When communicating with the card terminal 3 or the electronic money terminal 80, the VALUE processing section 68 performs wireless communication via an antenna included in the terminal. In this case, the user places the cell phone 60 near the card terminal or the electronic money terminal.

Communication with the electronic money server 5 is performed via the application 62 over the Internet.

As such, the cell phone 60 communicates with the electronic money terminal or the electronic money server 5 to input amount change information to the electronic money function portion 67, thereby charging up the electronic money function portion 67 with "VALUE" or making settlement by using "VALUE" in the electronic money function portion 67.

In addition, the VALUE processing section 68 is capable of wireless communication with the card terminal 3, and therefore it is possible to perform charging-up with "VALUE" by placing the cell phone in the card terminal 3 as in the case of the electronic money card 9.

Figure 13:
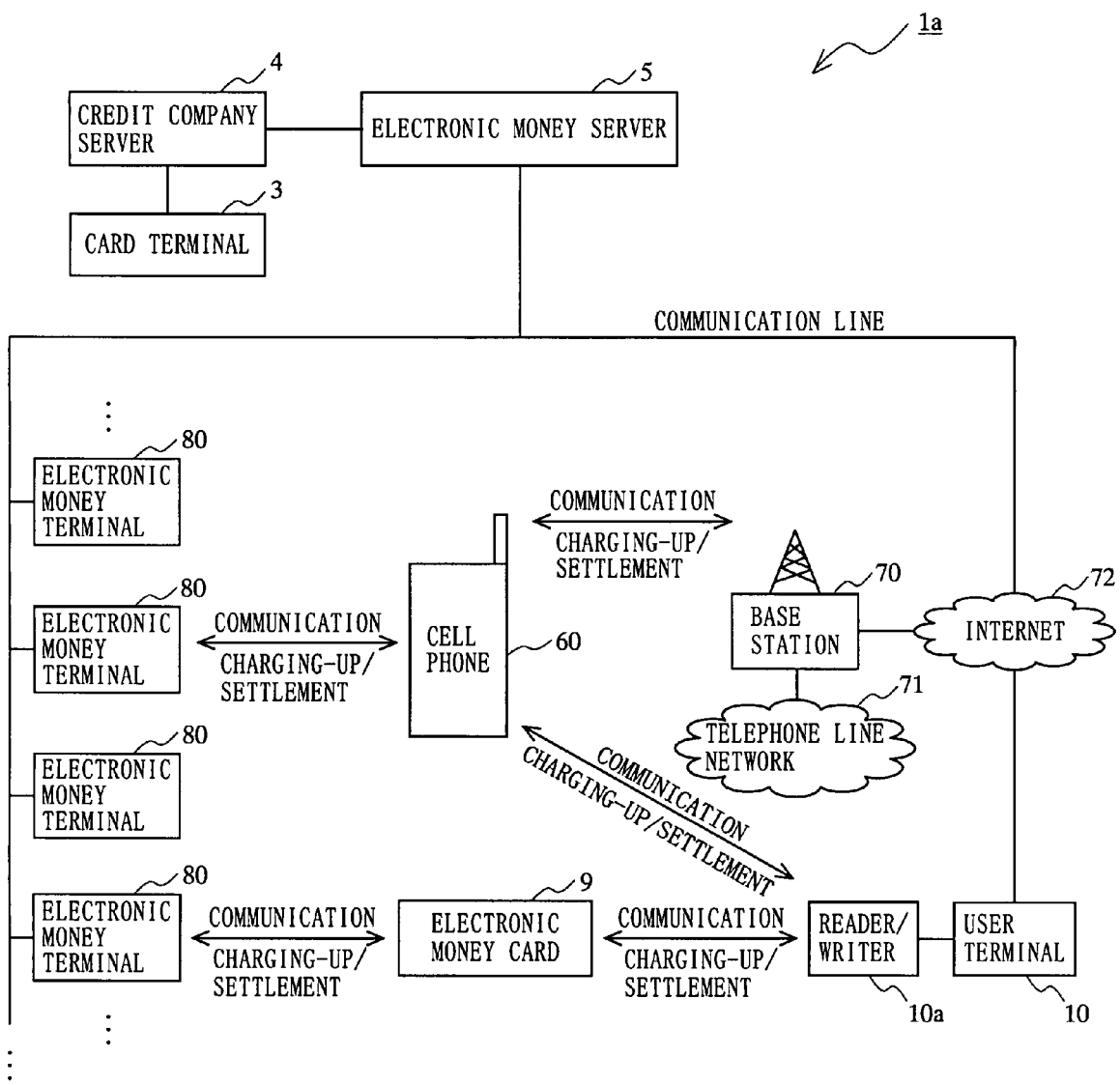
FIG. 13 is a diagram for explaining how the electronic money card and the cell phone are used.

FIG. 13 is a diagram for explaining how the electronic money card 9 and the cell phone 60 are used.

After being charged up, the electronic money card 9 and the cell phone 60 are used in an electronic money system la shown in FIG. 13.

The electronic money system la includes the electronic money charging-up system 1 composed of the credit company server 4, the electronic money server 5, the card terminal 3, etc., and also includes the Internet 72, a base station 70, a telephone line network 71, electronic money terminals 80, a user terminal 10, etc.

The electronic money terminals 80 are terminal devices for accessing a contactless-type IC card, which are installed at stores and exclusively designed for electronic money business.

The electronic money terminals 80 are each provided with a reader/writer portion including an antenna by which to transmit/receive electric waves to perform short-range wireless communication with contactless-type IC chips embedded in monetary terminals such as the electronic money card 9 and the cell phone 60.

The electronic money terminals 80 are capable of wireless communication with the monetary terminals such as the electronic money card 9 and the cell phone 60 to read electronic money card IDs set thereof and balances of "VALUE" stored therein or to input amount change information to the monetary terminals to increase/decrease the amounts of "VALUE".

In such a manner, the electronic money terminals 80 are capable of increasing/decreasing "VALUE" stored in the electronic money card 9 and the cell phone 60. Therefore, when charging up the electronic money card 9 or the cell phone 60, a payment equivalent to an amount of money used for the charging-up is collected from the user (or such a payment is made by the credit card 8), and settlement for merchandise or service is made by subtracting "VALUE" owned by the user, rather than by collecting a payment for the merchandise or service from the user, so that "VALUE" can be circulated as a substitute for money.

The user terminal 10 is a terminal device, such as a personal computer, which is capable of connecting to the electronic money server 5 via the Internet 72.

In addition, the user terminal 10 is provided with a reader/writer 10a as a peripheral device by which to perform short-range wireless communication with the electronic money card 9 and the cell phone 60.

Furthermore, the user connects the electronic money card 9 or the cell phone 60 to the user terminal 10 via the reader/writer 10a, and further connects the user terminal 10 to the electronic money server 5, thereby connecting the electronic money card 9 or the cell phone 60 to the electronic money server 5.

This makes it possible for the electronic money server 5 to increase/decrease "VALUE" in the electronic money card 9 or the cell phone 60.

In the case of the cell phone 60, it is also possible to connect it to the electronic money server 5 via the base station 70.

Note that the telephone line network 71 is a network used by the cell phone 60 to make a call.

As described above, the electronic money system 1a is a circulation mechanism for circulating "VALUE" in the same manner as currency is circulated, so that the user can use "VALUE" obtained by charging-up with the credit card 8 for purchasing merchandise and services.

Next, variants of the credit card 8 and the electronic money card 9 will be described.

FIG. 14A illustrates a case where a contactless-type IC card is provided as a credit card 8a.

The credit card 8a has the same functions as the credit card 8, which is a contact-type IC card, but its interface for connecting to the card terminal 3 is a contactless-type.

In this case, the card terminal 3 authenticates a PIN for the credit card 8a via the reader/writer 7, and reads a credit card number of the credit card 8a via the reader/writer 7.

As such, when both the credit card 8a and the electronic money card 9 are contactless-type IC cards, it is possible to perform processing with the reader/writer 7 without having to use the reader/writer 6.

Note that the reader/writer 7 is not capable of simultaneously accessing the credit card 8a and the electronic money card 9, and therefore, for example, the card terminal 3 causes the user to first place the credit card 8a in the reader/writer 7 for processing, and then place the electronic money card 9 in the reader/writer 7 to charge up the electronic money card 9.

Note that in FIG. 14A, both the credit card 8a and the electronic money card 9 are contactless-type IC cards, but it is possible to use contact-type IC cards for the both of them.

In such a case, the both cards can be accessed via the reader/writer 6 to perform processing as described above.

FIG. 14B illustrates a case where a contactless-type IC card 9a functions as both the credit card 8 and the electronic money card 9.

The contactless-type IC card 9a can be realized by incorporating into an IC chip embedded therein a program for carrying out a credit card function and a program for carrying out an electronic money card function.

The card terminal 3 is capable of communicating with the contactless-type IC card 9a via the reader/writer 7, and switching the drive mode of the contactless-type IC card 9a between a credit card mode and an electronic money card mode.

In the case of performing credit card-related processing, the card terminal 3 drives the contactless-type IC card 9a in the credit card mode to, for example, authenticate a PIN, whereas in the case of performing charging-up processing, the card terminal 3 drives the contactless-type IC card 9a in the electronic money card mode.

Thus, the user can perform both the credit card-related processing and the electronic money card-related processing by simply placing the contactless-type IC card 9a in the reader/writer 7.

Note that it is also possible to provide the contact-type IC card with the credit card function and the electronic money card function. In such a case, the contact-type IC card can be accessed via the reader/writer 6.

In addition, it is possible to embed into a single card a contact-type IC chip having the credit card function and a contactless-type IC chip having the electronic money function.

In this case, the card includes a contact terminal for accessing the reader/writer 6 and a high-frequency circuit for accessing the reader/writer 7. The card is placed in the reader/writer 6 for use as a credit card, and in the reader/writer 7 for use as an electronic money card.

On the other hand, it is also possible to embed into a single card a contact-type IC chip having the electronic money card function and a contactless-type IC chip having the credit card function.

In this case, the card is placed in the reader/writer 7 for use as a credit card, and in the reader/writer 6 for use as an electronic money card.

FIG. 14C illustrates a case where the cell phone 60 has embedded therein a contactless-type IC chip for carrying out the electronic money card function.

In this case, the card terminal 3 can access the cell phone 60 via the reader/writer 7, and therefore the cell phone 60 can be used in the same manner as the electronic money card 9 is used.

Specifically, the cell phone 60 can be charged up the electronic money card 9, with "VALUE" purchased with the credit card 8.

In addition, it is also possible to make a further variation to provide the credit card function to the contactless-type IC chip embedded in the cell phone 60.

In this case, by simply placing the cell phone 60 in the reader/writer 7, it is made possible to purchase "VALUE" and charge up the cell phone 60 with the purchased "VALUE" without having to use the credit card 8.

Furthermore, in addition to the cell phone 60, various media such as wristwatches and PDAs (Personal Digital Assistants) can be embedded with the contact-type IC chip and the contactless-type IC chip.

As described above, the credit card function and the electronic money card function can be implemented by IC chips, which can be either of contact-type or of contactless-type.

In addition, the credit card function and the electronic money card function can be implemented by a single IC chip.

Therefore, it is possible to embed the credit card function and the electronic money function into various types of media.

While the embodiment and the variants have been described above, various variations can be made to server devices.

For example, the credit company server 4 and the electronic money server 5 can be implemented by a single server device, or the credit company server 4 and the electronic money server 5 can be each implemented as a system consisting of a plurality of server devices.

The above described embodiment and variants make it possible to purchase "VALUE" by billing a credit card, and charge up the electronic money card 9, the cell phone 60, etc., with the purchased "VALUE".

What is claimed is:

1. A financial server comprising:
a receiver;
at least one processor; and
at least one memory device storing instructions which when executed by the at least one processor, cause the at least one processor to operate with the receiver to:
(a) receive, from an IC card terminal having authenticated an owner of a financial IC card based on authentication information stored in the financial IC card:
   (i) card specification information which specifies the financial IC card; and
   (ii) amount information;
(b) provide, to an electronic money server:
   (i) the amount information; and
   (ii) owner identification information for the owner specified by the card specification information, the electronic money server being configured to transmit, to a monetary terminal, amount change information for increasing/decreasing an amount of a monetary value, the monetary terminal being configured to increase/decrease an amount of the monetary value stored in said monetary terminal based on the amount change information; and
(c) bill the owner for a fee based on the provided amount information.

2. The financial server of claim 1, wherein when executed by the at least one processor, the instructions cause the processor to:
(a) receive the owner identification information for the owner, along with the card specification information; and
(b) provide the received owner identification information to the electronic money server.

3. An IC card terminal comprising:
an input device;
a transmitter;
a receiver;
a processor; and
a memory device storing instructions which when executed by the processor, cause the processor to:
(a) authenticate an owner of a financial IC card based on authentication information stored in the financial IC card;
(b) acquire card specification information for specifying the financial IC card from the financial IC card;
(c) acquire amount information for the authenticated owner;
(d) transmit the acquired card specification information and the acquired amount information to a financial server;
(e) receive amount change information which is transmitted from an information transmission means electronic money server in response to the transmitted card specification information and amount information; and
(f) an input means for inputting input the received amount change information to a monetary terminal which increases/decreases an amount of a monetary value stored in said monetary terminal based on the amount change information.

4. A financial information processing method for use in a computer provided with a card information reception means, a card information providing means and a billing means, the method comprising:
a card information reception step performed by the card information reception means for receiving, from an IC card terminal having authenticated an owner of a financial IC card based on authentication information stored in the financial IC card:
(a) card specification information which specifies the financial IC card; and
(b) amount information;
a card information providing step performed by the card information providing means for providing, to an electronic money server:
(a) the amount information; and
(b) owner identification information for the owner specified by the card specification information, the electronic money server being configured to transmit, to a monetary terminal, amount change information for increasing/decreasing an amount of a monetary value, the monetary terminal being configured to increase/decrease an amount of the monetary value stored in said monetary terminal based on the amount change information; and a billing step performed by the billing means for billing the owner for a fee based on the provided amount information.

5. A financial information processing method for use in a computer provided with an authentication means, a card specification information acquisition means, an amount information acquisition means, a card information transmission means, an amount change information reception means and an input means, the method comprising:

an authentication step performed by the authentication means for authenticating an owner of a financial IC card based on authentication information stored in the financial IC card;

a card specification information acquisition step performed by the card specification information acquisition means for acquiring card specification information for specifying the financial IC card from the financial IC card;

an amount information acquisition step performed by the amount information acquisition means for acquiring amount information for the authenticated owner;

a card information transmission step performed by the card information transmission means for transmitting the acquired card specification information and the acquired amount information to a financial server;

an amount change information reception step performed by the amount change information reception means for receiving amount change information which is transmitted from an electronic money server in response to the transmitted card specification information and amount information; and an input step performed by the input means for inputting the received amount change information to a monetary terminal which increases/decreases an amount of a monetary value stored in said monetary terminal based on the amount change information.

6. The financial server of claim 1, wherein when executed by the processor, the instructions cause the processor to receive, from the IC card terminal, an authentication result, wherein the financial server does not receive the authentication information.

* * * * *